(12) United States Patent
Chinowsky et al.

(10) Patent No.: US 10,925,355 B2
(45) Date of Patent: Feb. 23, 2021

(54) FUNCTIONAL, SOCIALLY-ENABLED JEWELRY AND SYSTEMS FOR MULTI-DEVICE INTERACTION

(71) Applicant: Loop Devices, Inc., Seattle, WA (US)

(72) Inventors: Tim Chinowsky, Seattle, WA (US); Martin Unger, Seattle, WA (US); Charles Borwick, Seattle, WA (US); Michael Bettua, Seattle, WA (US); Colin Bricken, Seattle, WA (US); Dav Lion, Seattle, WA (US); Kyle Johnston, Seattle, WA (US)

(73) Assignee: Loop Devices, Inc., Seattle, WA (US)

( * ) Notice: Subject to any disclaimer, the term of this patent is extended or adjusted under 35 U.S.C. 154(b) by 0 days.

(21) Appl. No.: 16/715,604

(22) Filed: Dec. 16, 2019

(65) Prior Publication Data

US 2020/0128928 A1 Apr. 30, 2020

Related U.S. Application Data

(62) Division of application No. 15/540,242, filed as application No. PCT/US2015/000484 on Dec. 23, 2015, now Pat. No. 10,542,793.

(Continued)

(51) Int. Cl.
*A44C 5/00* (2006.01)
*H04R 1/02* (2006.01)
(Continued)

(52) U.S. Cl.
CPC .......... *A44C 5/0015* (2013.01); *A44C 5/0084* (2013.01); *A44C 15/0015* (2013.01); *F21V 7/0091* (2013.01); *F21V 33/0008* (2013.01); *G06F 1/163* (2013.01); *G06F 1/1694* (2013.01); *G06F 3/017* (2013.01); *G06F 3/0346* (2013.01); *G06F 3/03547* (2013.01); *H04R 1/028* (2013.01); *F21Y 2103/10* (2016.08); *F21Y 2113/17* (2016.08); *F21Y 2115/10* (2016.08);

(Continued)

(58) Field of Classification Search
None
See application file for complete search history.

(56) References Cited

U.S. PATENT DOCUMENTS

| | | | | |
|---|---|---|---|---|
| 2014/0045547 | A1* | 2/2014 | Singamsetty | H04M 1/0279 455/552.1 |
| 2014/0354153 | A1* | 12/2014 | Pulido, Jr. | B60Q 3/80 315/77 |
| 2015/0049873 | A1* | 2/2015 | Buller | H04R 1/028 381/56 |

* cited by examiner

*Primary Examiner* — Thomas S McCormack
(74) *Attorney, Agent, or Firm* — DLA Piper LLP (US)

(57) ABSTRACT

Functional jewelry is disclosed. A bracelet includes a plurality of light-emitting diodes (LEDs), a main control unit, and positional and situational sensors, typically including an accelerometer, as well as a decorative, interchangeable fascial layer. The bracelet may also include sensors such as capacitive touch sensors, a microphone, and a color sensor. A radio transceiver within the bracelet is adapted to implement a protocol such as BLUETOOTH® 4.0, and is adapted to allow the bracelet to communicate in peer-to-peer or master-slave mode. Two users can pair their bracelets in person, usually with a gestural trigger, for shared light displays, multi-player games, and other types of interactions. Larger groups can pair temporarily and contextually for multi-user displays and interactions, in an ad hoc network with distributed functions. Real-world interactions are communicated to a social network with profiles linked to the individual bracelets.

18 Claims, 15 Drawing Sheets

Related U.S. Application Data

(60) Provisional application No. 62/097,527, filed on Dec. 29, 2014, provisional application No. 62/362,274, filed on Jul. 14, 2016.

(51) Int. Cl.

| | |
|---|---|
| *F21V 33/00* | (2006.01) |
| *G06F 1/16* | (2006.01) |
| *G06F 3/0354* | (2013.01) |
| *G06F 3/0346* | (2013.01) |
| *A44C 15/00* | (2006.01) |
| *F21V 7/00* | (2006.01) |
| *G06F 3/01* | (2006.01) |
| *G06F 3/044* | (2006.01) |
| *F21Y 115/10* | (2016.01) |
| *F21Y 103/10* | (2016.01) |
| *F21Y 113/17* | (2016.01) |

(52) U.S. Cl.
CPC .............. *G06F 2203/04102* (2013.01); *H04R 2410/00* (2013.01)

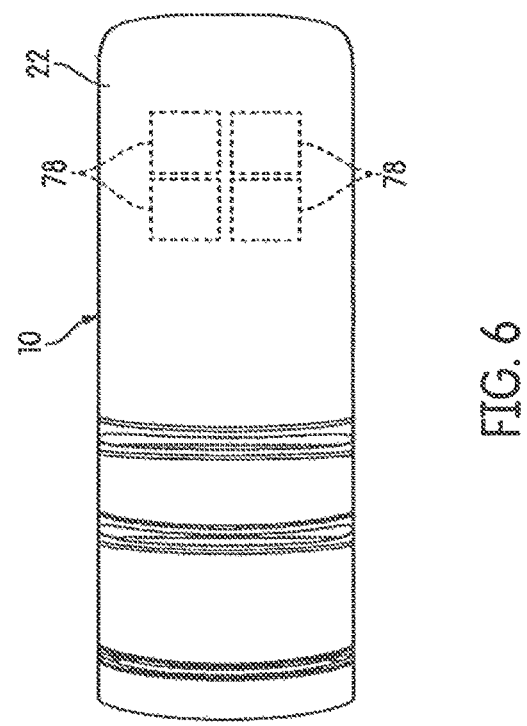

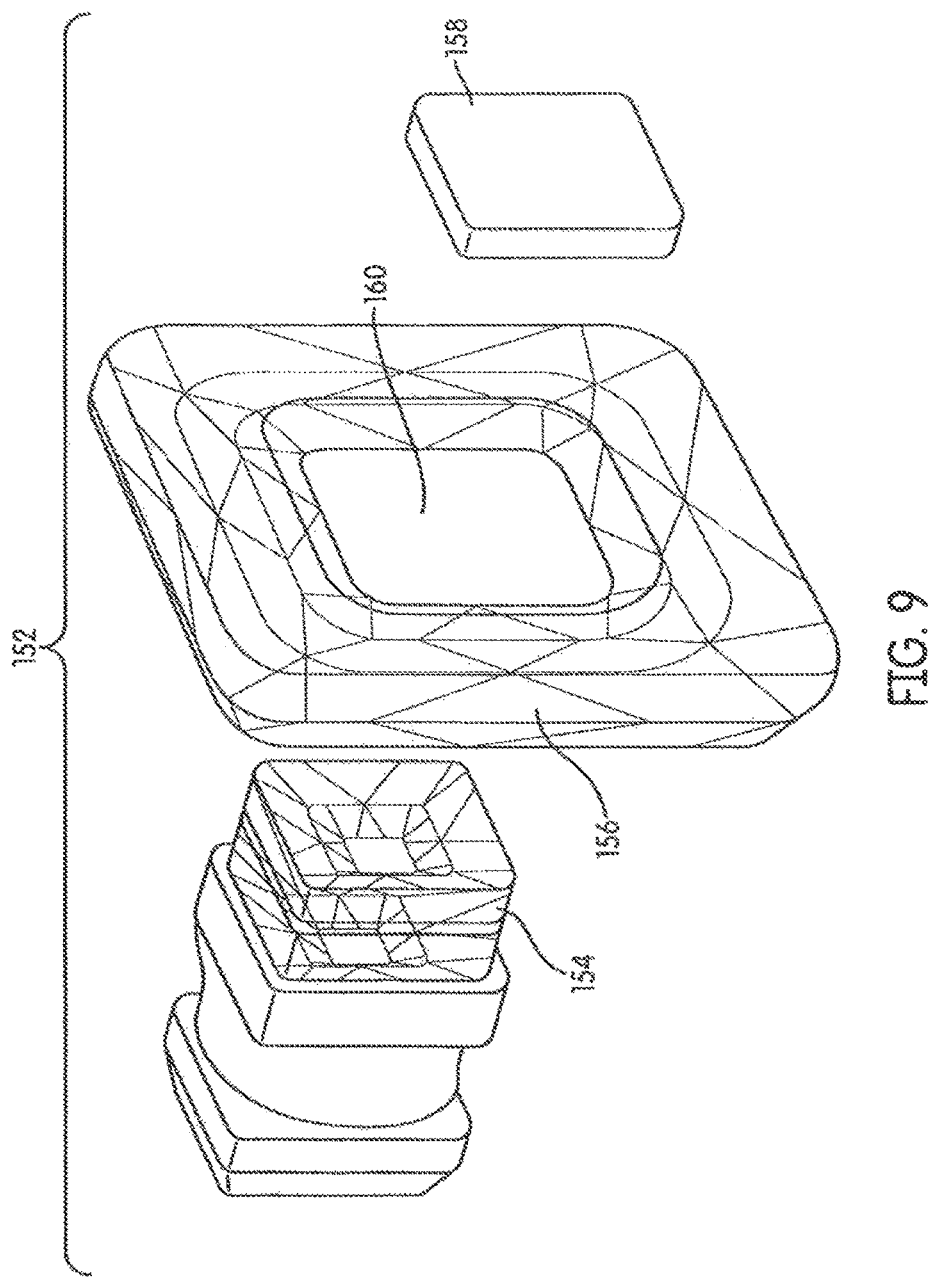

FUNCTIONAL, SOCIALLY-ENABLED JEWELRY AND SYSTEMS FOR MULTI-DEVICE INTERACTION

CROSS-REFERENCE TO RELATED APPLICATIONS

This application claims priority to, and the benefit of, U.S. Provisional Patent Application No. 62/097,527, filed Dec. 29, 2014. The contents of that application are incorporated by reference in their entirety.

TECHNICAL FIELD

In general, the invention relates to communication and signaling devices that can be used for decoration, interaction, and gaming, and more particularly, to functional jewelry that can communicate and allow users to interact.

BACKGROUND OF THE INVENTION

For decades, perhaps since the advent of television, society has been embroiled in a debate: how much "screen time" is too much? How do we reconcile the often-solitary pursuit of media consumption—watching television and movies, listening to music, and playing video games—with our need to interact with other people? As the "Internet of things" and its plethora of connected devices have become a daily reality, the number of devices that vie for our attention has increased, and with it the need to re-evaluate the ways in which we interact with our devices—and the ways in which we interact with each other.

Technology has become so embedded in our lives and culture that removing it entirely is simply not feasible for most people. The challenge, then, is how to engineer devices to facilitate genuine and engaging interactions between people—both at a distance and in person.

Many of the issues involved are themselves technological. For example, many smaller devices, like smart phones, use the BLUETOOTH® communications protocols for short-range communication with other devices. That short-range communication is usually done with a master-slave configuration and protocol: one device, usually the more capable one, acts as the master and the other one acts as the slave device. The master directs and performs all of the substantive computing, while the slave usually provides simple input or output with limited bi-directional communication. In this fashion, one might connect headphones, a car audio system, or a keyboard to a smart phone or tablet computer. Most devices are simply not equipped or programmed for full peer-to-peer communication with computing and substantive functions performed by both devices.

Beyond communication protocols, any designer of a device for personal use has the task of creating a capable, engaging device in a package that is lightweight and aesthetically pleasing enough to encourage use. Of all personal devices, jewelry and other small, wearable items present some of the sharpest challenges, because these items are traditionally among the smallest and are thus most subject to technical and size limitations, as well as aesthetic considerations. Simply put, most people will not wear a piece of jewelry that is unattractive, too large, or too heavy—whether or not that piece of jewelry is a device with interesting technical capabilities.

SUMMARY OF THE INVENTION

One aspect of the invention relates to functional, socially-enabled pieces of jewelry. One embodiment of this aspect of the invention comprises a functionally-enabled bracelet. The bracelet includes a main control unit, an LED controller connected to the main control unit, a plurality of LEDs connected to the LED controller, one or more positional or situational sensors, and a radio transceiver. The radio transceiver may implement a communication protocol such as the BLUETOOTH® low energy (BLE) protocol, and may thus equip the bracelet for peer-to-peer communication as either master or slave. The positional or situational sensors may include an accelerometer, as well as other sensors, like a microphone and color sensor.

In this aspect of the invention, the bracelet or other type of jewelry has a removable and interchangeable fascial layer that includes one or more segments and that covers and is illuminated by the LEDs. Depending on the user's preferences and other factors, these segments may be made in a number of ways, and may include segments with printed designs, as well as molded, cast, or otherwise manufactured segments that include three-dimensional features, e.g., segments that resemble gems. These fascial segments are preferably designed and selected such that they have aesthetically pleasing properties both in reflected light and also in transmitted light. In some embodiments, segments made to resemble gems may include a total internal reflection (TIR) prism to scatter the light received from the LEDs in a way that increases the overall "sparkle" or attractiveness of the segment.

Another aspect of the invention relates to systems and methods for in-person interaction and gaming using bracelets and other types of jewelry with the functionality described above. In systems and methods according to these embodiments, compatible devices in the immediate area are detected, and individual users may pair their devices for joint operations by gestural triggers, like a handshake, and may then play joint games or partake in joint light displays using the bracelets and other types of jewelry. The amount of time users spend in in-person interactions may be logged and stored, and in-person interaction may be favored insofar as "friend" status enabling joint interactions may only be established in some embodiments by an in-person interaction.

Yet another aspect of the invention relates to systems and methods of contextual group interaction using bracelets and other types of jewelry with the functionality described above. In systems and methods according to these embodiments, compatible devices in the immediate area are detected, and users may pair their devices as a group for shared access and operations that will typically not extend past the immediate context or environment. A group of users in this kind of "contextual" pairing may take part in group games and displays. During these games, the bracelets and other types of jewelry establish mesh networks that are easily joined and left as individual users join and leave the games and other activities. Additionally, the bracelets and other types of jewelry may self-assemble, identify nearest neighbors, and distribute functions used in administering the group activity between available nodes.

A further aspect of the invention relates to social networks and networked systems that allow users to manage, communicate with, and store information related to friends and others with whom the users interact using the bracelets and other forms of jewelry. In embodiments according to this aspect of the invention, a social network server receives logs of in-person interactions among social network users and implements a network-based interface that allows the users to review and annotate the data, as well as perform other functions, like instant message-based communication between users and the uploading of associated photos, video, and other multimedia content. Using the social network, users may also define groups and broadcast status information to all or some members of the group.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which:

FIG. 6 is an illustration of the location and extent of touch-sensitive areas of the bracelet of FIG. 1;

FIG. 9 is an exploded view of an exemplary "gemlike" decorative segment that may be applied to the bracelet of FIG. 1;

DETAILED DESCRIPTION

Figure 1:
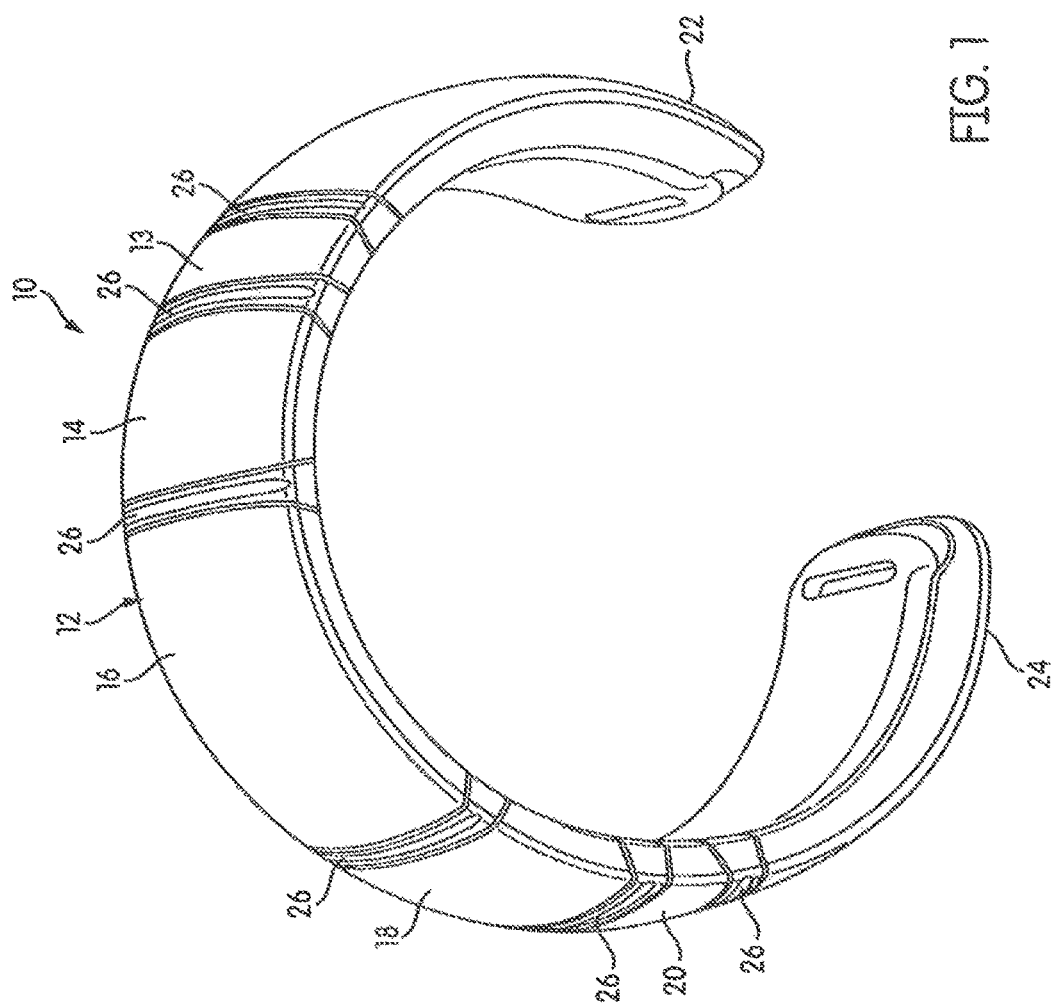
FIG. 1 is a perspective view of a light-signaling bracelet with interchangeable appearance segments according to one embodiment of the invention.

FIG. 1 is a perspective view of a light-signaling bracelet, generally indicated at 10, according to one embodiment of the invention. The bracelet 10 has an interchangeable fascial layer 12 that, in the illustrated embodiment, is divided into a plurality of modular segments 13, 14, 16, 18, 20. These segments 13, 14, 16, 18, 20 are designed to be decorative and aesthetically pleasing, and the fascial layer 12 may include any number of them, depending on the size of the bracelet 10, its curvature, and other conventional factors.

As the bracelet 10 itself is curved, the segments 13, 14, 16, 18, 20 themselves are also curved to follow the curvature of the bracelet itself 10. The segments 13, 14, 16, 18, 20 need not be identical, though: in the illustrated embodiment, a central segment 16 is longest, and mirror-image progressively shorter segments 13, 14, 18, 20 are arrayed around it.

Some embodiments of the bracelet 10 may be round, such that the bracelet 10 has a single, continuous curvature, while other embodiments may have some portions that are more curved and other portions that are more flattened. In either case, the segments 13, 14, 16, 18, 20 will mirror the curvature of the bracelet 10 as a whole.

In a typical configuration, a number of the segments 13, 14, 16, 18, 20 are backed by lighting elements, such as light emitting diodes (LEDs), and are thus adapted to be selectively illuminated so as to communicate messages, provide alerts, play single- and multi-player games, and otherwise interact with other bracelets 10, as will be described below in more detail. Other portions of the bracelet 10, such as end portions 22, 24, are not backed by lighting elements. As will be described below in more detail, in a typical embodiment, the end portions 22, 24 are also provided with touch sensitivity, such that they serve as small touchpads and provide both input and output functions. At least some of the segments 13, 14, 16, 18, 20 may also be provided with touch sensitivity in some embodiments. Joints 26 made of a flexible plastic, such as a thermoplastic elastomer or silicone, extend between individual segments 13, 14, 16, 18, 20 and provide a seal between adjacent segments 13, 14, 16, 18, 20.

Figure 2:
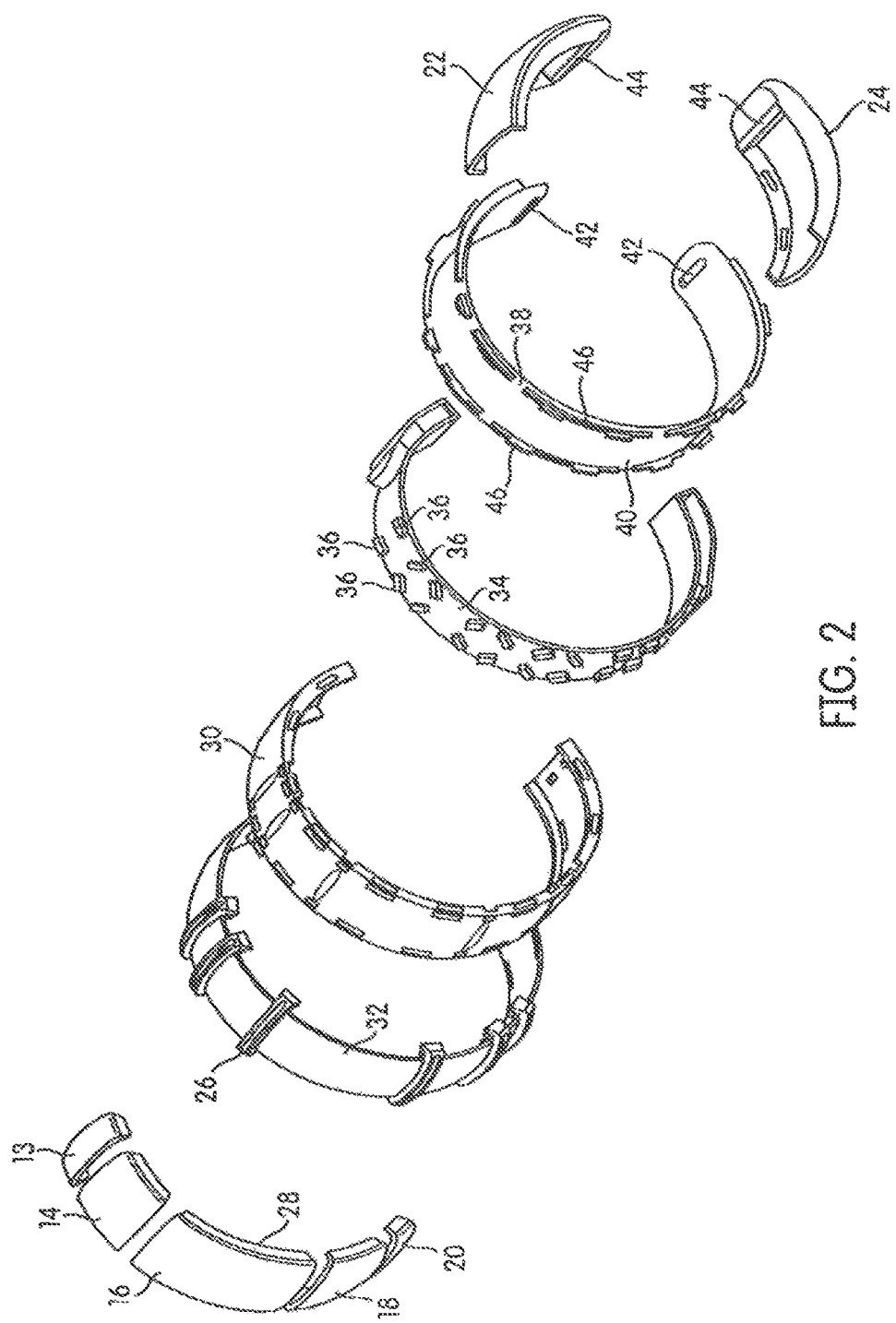
FIG. 2 is an exploded perspective view of the bracelet of FIG. 1.

FIG. 2 is an exploded perspective view of the bracelet 10 of FIG. 1. The segments 13, 14, 16, 18, 20, 22, 24 have depending flanges 28 that allow them to snap onto a cover 30, between positions established by the joints 26. The joints 26 themselves are on a band 32 that is co-molded with the cover 30. The cover 30 and band 32 are at least translucent, so as to admit light emitted below them.

Beneath the cover 30, the bracelet 32 includes a flexible printed circuit board (PCB) 34, such as a polyimide PCB. Arrayed along the PCB 34 are groups of two or four RGB LED assemblies 36. Each of the LED assemblies 36 includes individual red, green, and blue LEDs that are controllable to emit any of millions of different colors. With the LED assemblies 36 arrayed along the length of the PCB 34 and the PCB 34 itself spanning the length of the illuminated segments 13, 14, 16, 18, 20, the bracelet 10 can illuminate any of the segments, or any portion of the segments, in essentially any color and essentially any pattern. This provides a great deal of adaptability in the functions that the bracelet 10 can perform.

Beneath the PCB 34 is a curved, "skeleton" band 40 made, for example, of aluminum, steel, or plastic. The band 40 provides additional mechanical support and durability to the bracelet 10 as a whole, and can also bend slightly to accommodate larger and smaller wrists. In some embodiments, it may be used as a kind of spring, allowing the gap between the ends of the bracelet 10 to widen in order to put the bracelet 10 on or to take it off. As shown in the view of FIG. 2, the band 40 has slots 42 that are sized to engage rectangular projections 44 on the end portions 22, 24. The band 40 also has upward projections 46 spaced along its edge. The upward projections 46 are shaped and adapted to engage the cover 30 and other components.

Figure 3:
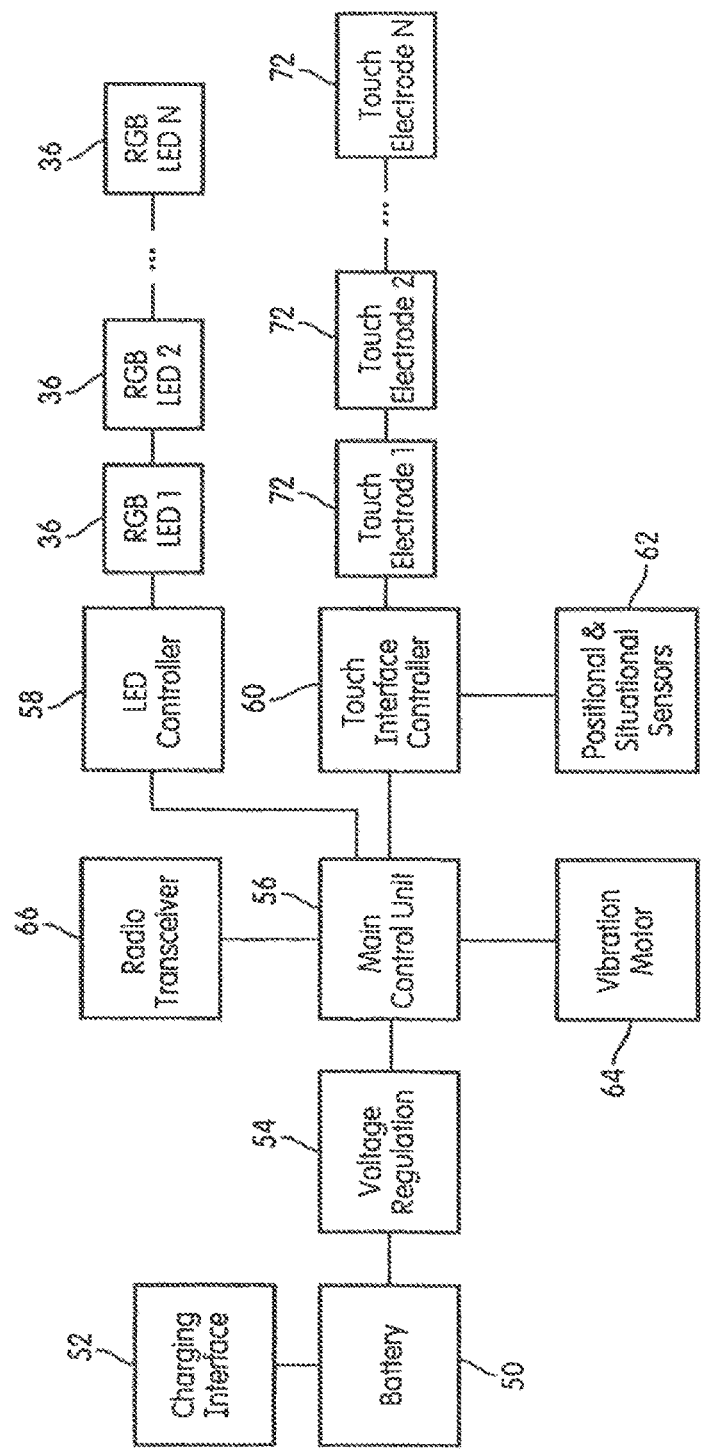
FIG. 3 is a schematic diagram of the electronic components of the bracelet of FIG. 1.

Generally speaking, the electronics that power, drive, and control the bracelet 10 will be located either physically on the PCB 34 or connected to it. FIG. 3 is a schematic diagram of the electronic components of the bracelet 10. The bracelet 10 is designed to be a portable, wireless device. Thus, it is equipped with a battery 50. The battery would typically be a lithium polymer (LiPo) rechargeable battery, although other rechargeable battery chemistries, like nickel-cadmium and nickel metal hydride, may be used in some embodiments.

In many, if not most, embodiments, the parts of the bracelet 10 will connect together mechanically such that they are not intended to be disassembled by the user, save for the replacement of the fascial layer 12 with its segments 13, 14, 16, 18, 20. For at least that reason, a rechargeable battery is desirable because it allows for continued use of the bracelet 10 without disassembly. However, in some embodiments, the bracelet 10 may be designed to allow the user to replace the battery, either to allow replacement of a rechargeable battery that has reached the end of its service life, or to allow the use of non-rechargeable batteries. If so, the bracelet 10 may include a small access cover, e.g., in the end portions 22, 24.

Assuming that the bracelet 10 uses a rechargeable battery, it is connected to a charging interface 52, as shown in FIG. 3. A wide variety of charging interfaces are known in the art, and any suitable one may be used. In general, charging interfaces fall into two categories: wired charging and wireless (i.e., inductively coupled) charging, and embodiments of the invention may use either type of charging interface 52. In a typical wired charging interface, a small port would be provided in the bracelet 10, and a cable would connect between the port and a power source. In this type of embodiment, the other end of the cable would typically be connected to a transformer-rectifier that converts household alternating current (AC) power to a direct current (DC) voltage appropriate for the bracelet 10. In some embodiments, the connector and charging interface 52 may be particular to the bracelet 10; in other embodiments, the bracelet 10 may use a known charging interface 10, like a mini-USB port.

In the case of wireless charging, the charging interface 52 would be a secondary electromagnetic coil and associated hardware. A primary coil (not shown) belonging to a charging station connected to a power source would inductively transfer power to the secondary coil of the charging interface 52, as is well known in the art.

The battery 50 is connected to a conventional voltage regulator 54 that provides a steady and appropriate voltage to a main control unit 56. The main control unit 56 is typically a microcontroller, such as a TI MSP430 microcontroller (Texas Instruments, Inc., Dallas, Tex.) but may be any other type of integrated circuit device capable of performing the computational functions described here. In fact, while certain electronic components may be described separately here for clarity and ease in description, as those of skill in the art will appreciate, the bracelet 10 may use a system on a chip (SoC) that includes a microcontroller, input-output capabilities, a radio transceiver, and other components in a single chip package. As shown in FIG. 3, the main control unit 56 is connected to and in communication with an LED controller 58, a touch interface controller 60, one or more positional or situational sensors 62, a vibration motor 64, and a radio transceiver 66. If the main control unit 56 is a system on a chip, it may, for example, be an nRF51822 system on a chip (Nordic Semiconductor, Oslo, Norway), which includes a BLUETOOTH® radio transceiver that serves as the radio transceiver 66.

Of those components, the radio transceiver 66 provides the primary input-output device for communicating with other devices. The other devices may include other bracelets 10 in the course of interaction and gaming, as well as devices that may be used to program or instruct the bracelet 10, like desktop computers, laptop computers, smart phones, and tablet computers. In the most general embodiments of the bracelet 10, any communication protocol that allows the necessary functions can be used, including WiFi (IEEE 802.11a/b/g/n/ac), cellular telephone communication schemes, mesh network communication protocols (e.g., IEEE 802.15.4) and the BLUETOOTH® communication protocol.

Of the available protocols, the present inventors have found that the BLUETOOTH® low energy (BLE) communication protocol (also referred to as BLUETOOTH® Smart or BLUETOOTH® 4.0) is a particularly suitable protocol for the radio transceiver 66 to implement. Moreover, as will be described below in more detail, when this protocol is implemented in bracelets 10 according to embodiments of the invention, it is advantageous if it is implemented such that a bracelet 10 can be both a master/controller and a slave. In other words, as will be described below in more detail, BLE can be used to implement a dynamic mesh network comprised of bracelets 10 and other accessories that interact and cause their wearers to do the same.

The composition of the positional and situational sensors, which are generally indicated at 62, may vary from embodiment to embodiment, depending on the intended capabilities of the bracelet. The positional and situational sensors 62 may, in some embodiments, simply comprise an accelerometer, such as a triaxial accelerometer. However, in other embodiments, the bracelet 10 may also include other positional sensors, such as a gyroscope. For reasons that will be set forth in more detail below, the bracelet 10 is adapted to use its position in space, and gestures or movements of which it is a part, as a triggering input to take actions, like pairing and impairing, light activation, and communication. As those of skill in the art will appreciate, sensors like accelerometers and gyroscopes provide information on relative position and orientation in space and movements.

The positional and situational sensors 62 may also include a microphone, as well as a color sensor. A microphone would, for example, allow the bracelet 10 to detect the rhythm and beat of speech or music and to set or alter the frequency or other characteristics of light emitted by the LEDs 36 to match. A color sensor would, for example, allow the bracelet 10 to detect the color of a wearer's clothing and match LED 36 color output to the detected color.

Figure 4:
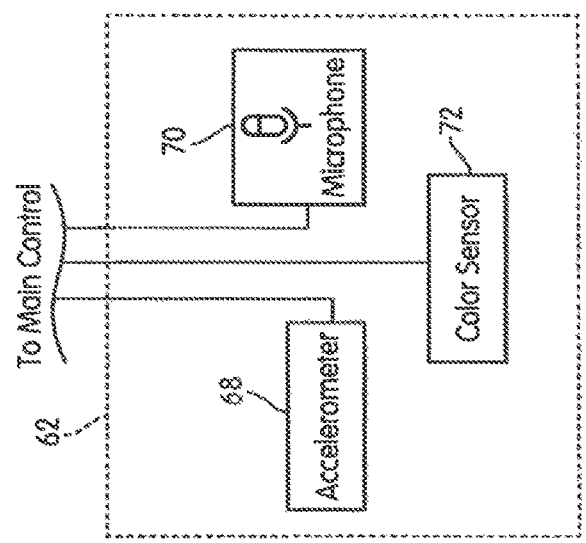
FIG. 4 is a diagram of an exemplary sensor package of the bracelet of FIG. 1.

FIG. 4 is a schematic diagram of a positional and situational sensor package 62 in a typical embodiment of a bracelet 10. An accelerometer 68, a microphone 70, and a color sensor 72 are all present, and all are adapted to be in communication with the main control unit 56. In addition to matching the color of a wearer's clothing, the color sensor 72 can be used to detect any ambient color and adjust the color of the LEDs 36 to match or complement that color. Other factors may be taken into account in modulating the output of the LEDs include the rate of change of the ambient color and any recent color gradients or transitions from one ambient color to another. As will be described below in more detail, the color sensor 72 may also be used in pairing operations.

Figure 5:
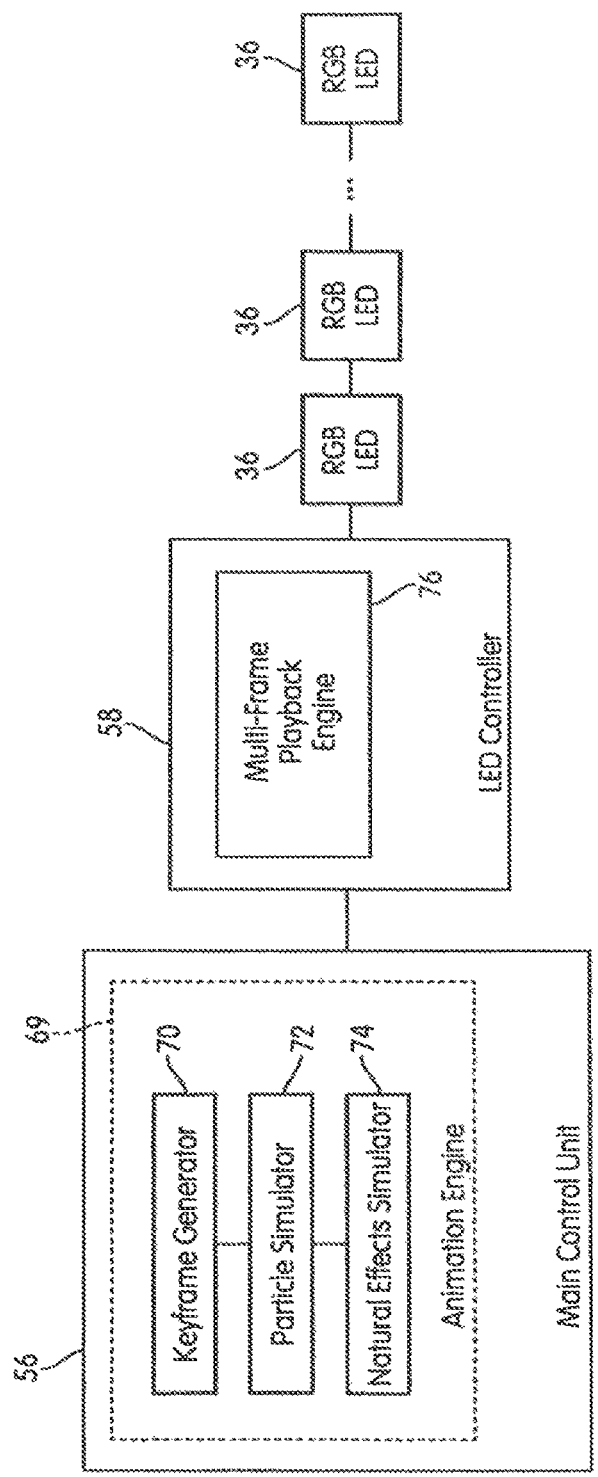
FIG. 5 is a schematic diagram of the main control unit and LED controller of FIG. 3, illustrating the elements of an animation system.

With respect to the components shown in FIG. 3, the LED controller 58 is connected to the individual RGB LED assemblies 36 and controls them. In practice, processing necessary to illuminate the LED assemblies 36 may be divided between the main control unit 56 and the LED controller 58. For example, the bracelet 10 may implement an animation system that allows the bracelet 10 to produce smooth animations and smooth, realistic transitions between colors, shapes, and lighting schemes. FIG. 5, a schematic illustration of the main control unit 56 and the LED controller 58, illustrates this animation system. The main control unit 56 implements an animation engine 69 that includes a keyframe transition generator 70, a particle simulator 72, and a natural effects simulator 74. These modules would typically be implemented in software on the main control unit 56 but may be implemented in hardware, or in some combination of hardware and software. The key frame transition generator 70, as it is known in the art, focuses on creating smooth transitions between the starting and ending points of an animation, the key frames. The particle simulator 72 simulates physical phenomena and movements, and the natural effects simulator 74 provides input when a natural, random phenomenon is to be simulated. The inclusion of animation engines 69 and capabilities in the bracelet 10 allows for smooth, realistic animations and graphics, even though the number of LEDs 36 is relatively limited.

Additionally, the touch interface controller 60 provides control and input/output functions for one or more touch-sensitive areas. As was described briefly above, although the segments 13, 14, 16, 18, 20 may be made touch-sensitive, their interchangeability and variable height and appearance may complicate the structure and increase the cost of the segments 13, 14, 16, 18, 20.

Therefore, as shown in the perspective view of FIG. 6, which illustrates one side of the bracelet 10 and one of its end portions 22. Beneath the end portion 22 is a set of electrodes 78, four in the illustrated embodiment, that are arranged in a grid pattern. The plastic of the end portion 22 serves as a dielectric, and the assembly thus becomes a grid of capacitive touch sensors. Each end portion 22, 24 may have similar electrode structures 78, or a touch-sensitive area may be provided on only one of the end portions 22, 24.

Decorative Segment Characteristics

As was described above, a bracelet 10 according to embodiments of the invention has a number of segments 13, 14, 16, 18, 20 that are interchangeable and are designed to be decorative and aesthetically pleasing. These segments 13, 14, 16, 18, 20 are curved to follow the curvature of the bracelet 10, and may be printed with decorative patterns, features, or images. In other embodiments, the segments 13, 14, 16, 18, 20 may be molded or otherwise formed to have three-dimensional portions that resemble gemstones. Printed and molded segments 13, 14, 16, 18, 20 may be used together in the same bracelet 10 at the same time, or a bracelet 10 may contain only printed segments or only gemstone-type segments at one time.

Segments 13, 14, 16, 18, 20 that are printed may be printed, or have designs created on them, in any fashion known. However, for the most compelling effect, the resulting segments 13, 14, 16, 18, 20 should be visually attractive both in reflected light and in transmitted light—that is, the segments 13, 14, 16, 18, 20 should look good when light is transmitted from the LEDs 36 beneath them, and also when one looks at them in daylight or room light. Thus, in particularly advantageous embodiments, there are typically portions of the segments 13, 14, 16, 18, 20 that are more translucent and portions that are less translucent.

Figure 7:
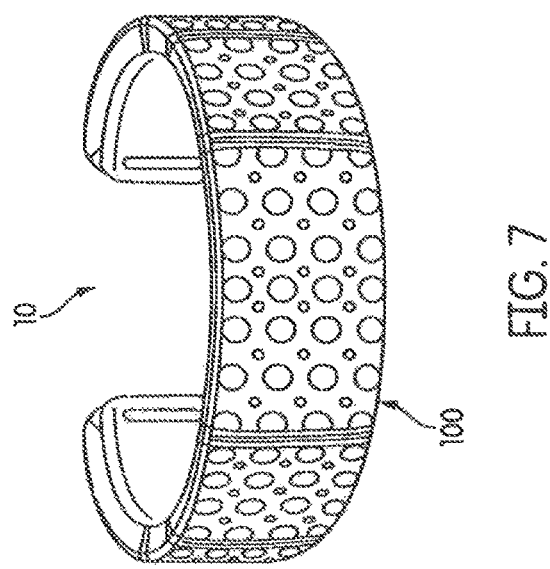

While painting, dyeing, co-molding and other known techniques are all suitable for creating segments 13, 14, 16, 18, 20, the present inventors have found that ultraviolet (UV) printing is a particularly suitable method for printing designs on segments 13, 14, 16, 18, 20. UV inks are typically two-part systems that polymerize, and are thus cured, when exposed to UV light. In a typical UV printing process, tiny droplets of UV ink are deposited on a substrate using an inkjet-type process and are then cured by application of UV light. FIG. 7 is an illustration of a bracelet 10 carrying a printed set of segments, generally indicated at 100.

Figure 8:
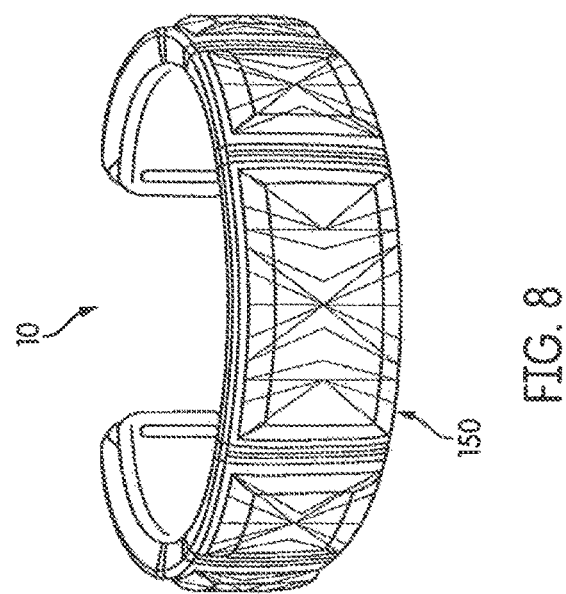
FIGS. 7 and 8 are perspective views of exemplary aesthetic designs that may be applied to the bracelet of FIG. 1.

FIG. 8 is an illustration of a bracelet 10 carrying a set of segments, generally indicated at 150, that are formed by injection molding. These segments 150 are three-dimensional and have the appearance of gemstones. Gemstone-segments 150 may be made in any shape or "cut" in which gemstones are usually cut, and may be colored in any color to simulate the appearance of various types of stones. Typically, the segments 150 will be made of a moldable plastic. However, in some embodiments, it is possible that the segments will contain actual cut stones—either actual gemstones or imitations. As those of skill in the art will appreciate, while all bracelets 10 may have essentially the same functions, or at least a common subset of functions allowing them and their users to interact, different sets of segments 100, 150 may have different price points and may be made to appeal to consumers of different interests.

Light from the LEDs 36 below the segments 100, 150 will be transmitted through any material that is at least translucent, and in that sense, the shape of any three-dimensional "gems" or items that are above those LEDs 36 may not be critical—the light will shine through and fulfill its purpose. However, if gem-shaped segments 150 are molded of a plastic, it is advantageous if the resulting segments have some "sparkle" or attractiveness when transmitting that light.

Figure 10:
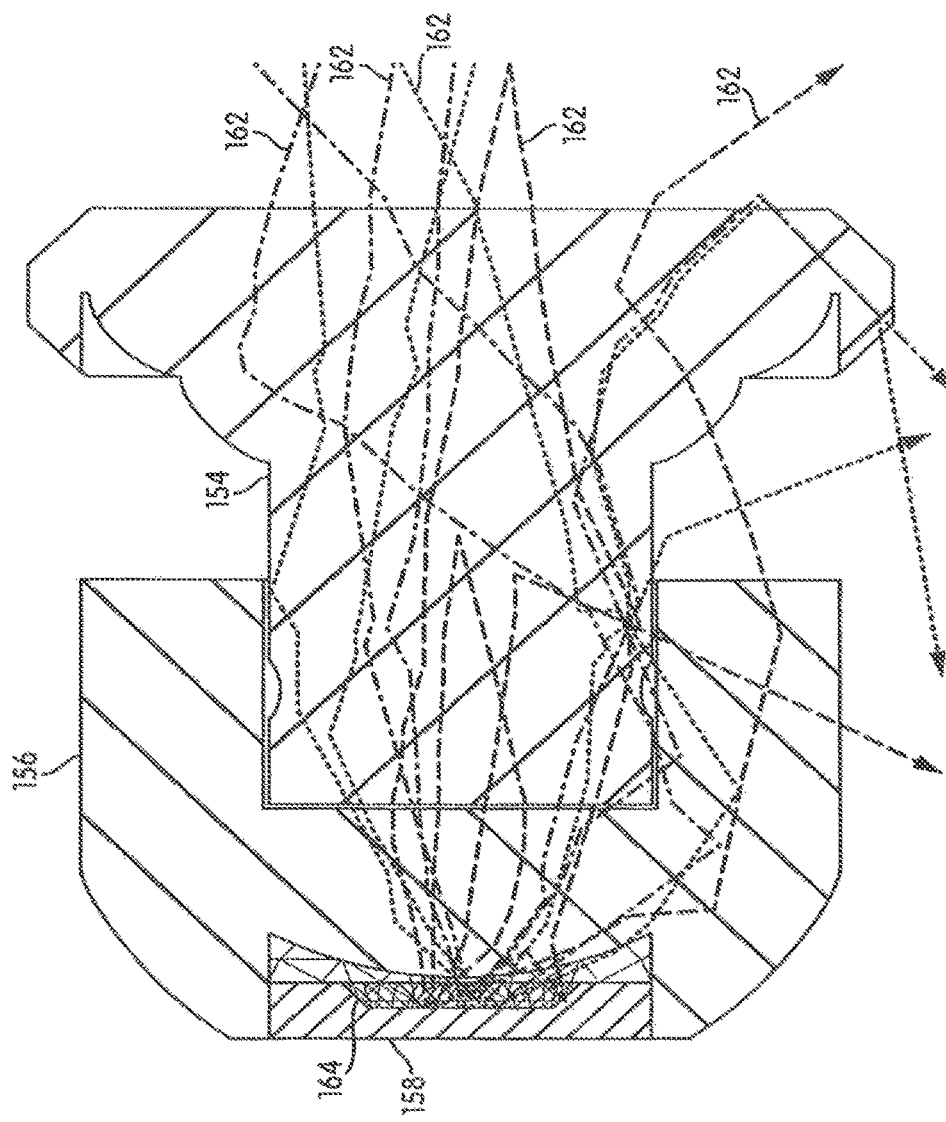
FIG. 10 is a cross-sectional view of the segment of FIG. 9.

FIG. 9 is an exploded view of a gem-shaped segment 152 according to one embodiment of the invention, and FIG. 10 is a cross-sectional view of the gem-shaped segment 152. The gem-shaped segment 152 includes a stem 154, a body 156, and a prism cap 158. The stem 154 receives the light transmitted from the LEDs 36. The stem 154 has a rectilinear shape in the illustrated embodiment, and may have any other keyed shape in other embodiments such that an opening 160 in the body 156 fits over and engages the stem 154. The engagement of the stem 154 and the opening 160 is such that one component will not rotate with respect to the other, and there is very little "play" between them.

The present inventors have found that if the light from the LEDs 26 is simply allowed to transit the segment 152, the result will be effective, but its appearance may be dull to the eye, particularly to those who are accustomed to viewing traditional cut stones, in part because much of the light goes straight up, without passing through the side facets of the segment 152.

Thus, in the illustrated embodiment, the prism cap 158 is a total internal reflection (TIR) prism that has the effect of preventing at least some of the light from going straight up and out. FIG. 10 is a cross-sectional view of the segment 152, schematically illustrating various rays of light 162 as they come up through the stem 154. As shown, the rays of light 162 are initially directed toward the prism cap 158, but are reflected back downwardly and outwardly from it, and thus pass outwardly through the body 156. This allows the segment 152 to radiate light more diffusely through more facets.

As those of skill in the art will appreciate, the prism cap 158 has a plurality of internal facets or planes 164 set at angles that maximize the number of light rays that will be incident on the segment/air interface at an angle greater than the critical angle for the material of which the segment 152 is made. In general, when designing segments 152 with particular aesthetic looks, the present inventors have found ray tracing simulations to be helpful in understanding the paths of the light rays.

Overall, the capabilities of the bracelet 10 and the interchangeability of its fascial layer 12, 100, 150 provide a variable-design, socio-dynamic, gesture-directed fashion wearable. The ways in which these bracelets 10, and other pieces of jewelry with the described functionality, may be used to facilitate interaction will be described below in more detail.

Social Interactions and Social Networks

Figure 11:
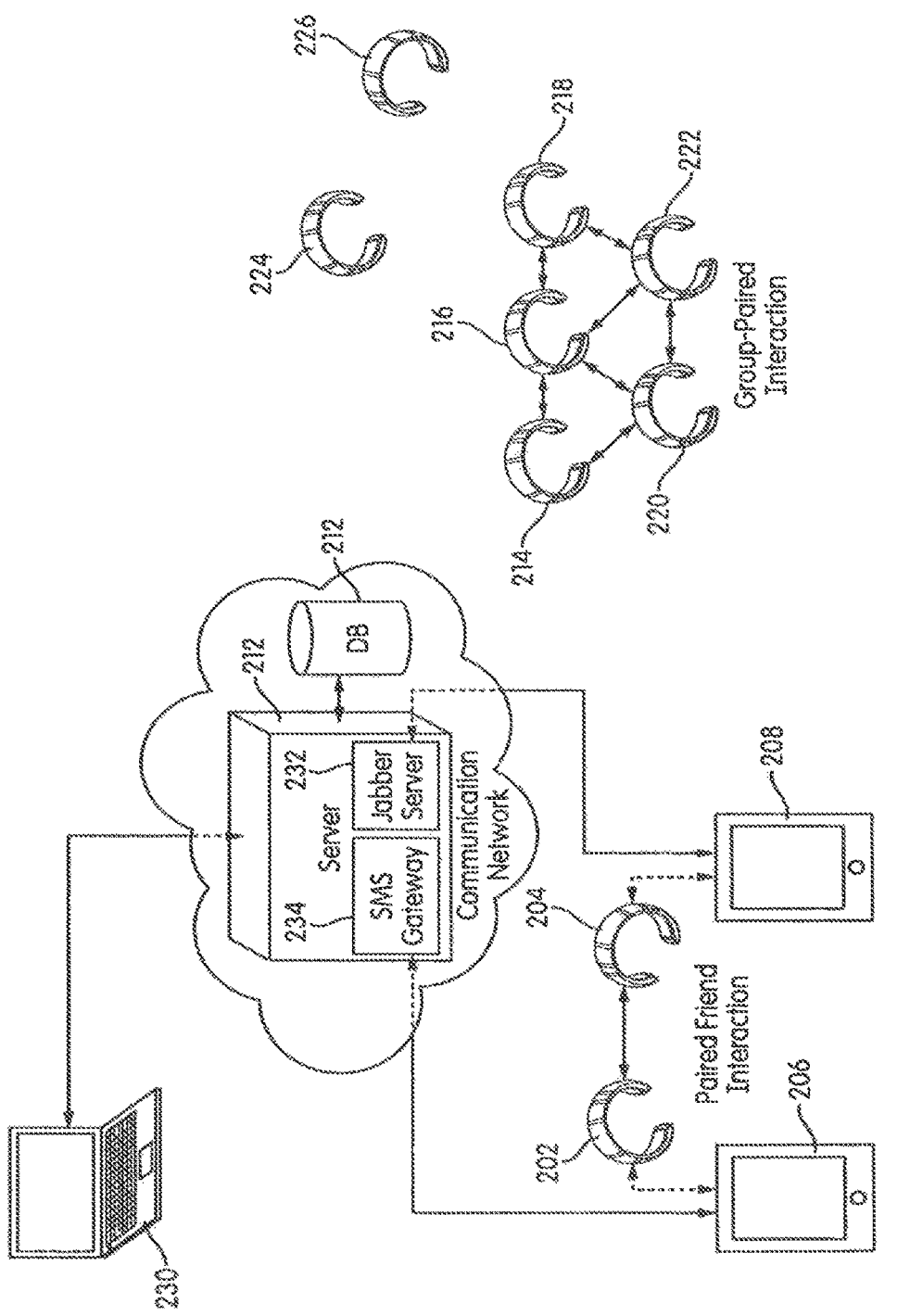
FIG. 11 is a schematic illustration of a system that incorporates multiple bracelets or other pieces of functional jewelry into social networks and multi-user collectives.

Bracelets 10 according to embodiments of the invention facilitate the creation of closed, secure social networks that are based on actual identity and actual, physical interaction. FIG. 11 is a schematic diagram of a system, generally indicated at 200, according to another embodiment of the invention. The system 200 implements a social network amongst a number of bracelets 10 and associated computing devices.

The social network 200 is based around in-person interaction among people wearing bracelets 10 and other wearable devices that have at least some of the capabilities described above. When in the same physical proximity, two bracelets 10 can be paired using their radio transceivers 66. Because real-life users have different types of friends in different types of contexts, system 200 and the bracelets 10 that are used in it have different types and tiers of "friends" and different types of pairings that may be used during interactions.

Generally speaking, as used in this description, the term "friends" refers to two users who have decided to permit each other to access each other's information on the social network. In most, if not all, embodiments of system 200, a friend relationship is only established by in-person interaction. More specifically, two bracelet users may form a "friend" relationship within the context of system 200 by performing a shared physical gesture with their bracelets 10 in proximity. The gesture can be any physical motion that can be detected by the positional and situational sensors 62, and most frequently will be a gesture detectable by the accelerometer 68. For example, users wearing bracelet 10 may simply shake hands in order to establish "friend" status with respect to the social network of system 200 and to cause their bracelets 10 to pair for games and other interactions. Other gestures that may be useable for pairing and friend-establishment in the context of system 200 may include "high-fives" and "low fives," a shake or twist of the wrist, first bumps, and gestures that are performed by one user and mirrored by the other. Of course, in some embodiments, although the actual pairing may only be permitted through in-person interaction, users may be permitted or encouraged to place potential social network friends in a "pending" status, in which some online access and privileges may be extended between the two users, pending an in-person meet and completion of a pairing ritual.

Before becoming friends with anyone on the social network of system 200, a user will typically establish an online profile and link one or more specific devices, like bracelet 10, to his or her profile. The link may be established by associating the user's profile with a specific hardware identifier of the bracelet 10. From that point on, the user associated with that specific profile will be assumed to be the wearer of the bracelet 10 with the specific identifier that has been input. The hardware identifier may be an identifier associated with the radio transceiver 66 or some other suitable identifier. Alternatively, it could be a code, code word, or phrase generated based on a specific bracelet 10.

The online profile to which the bracelet 10 is linked may contain any information typically included in a social network profile, as well as information specific to the user. For example, in addition to basic contact and interest information, the profile information may include information on the sets of segments 100, 150 that the user has, favorite types of fascial segments 100, 150, his or her "wish list" for additional segments 100, 150, scores on multi-player games played through the social network, and statistics on the number of friends the user has and the amount of time the user has spent with each of those friends, as well as other information that will be described below in more detail.

With respect to the illustration of FIG. 11, two users have decided to become social network friends and pair their bracelets 202, 204. The functions available to such friends will be described in greater detail below, but in general, the bracelets 202, 204 track the amount of time spent paired, as well as the frequency with which they are paired, allowing the users to track how much time they spend with each of their friends. Once paired, bracelets 202, 204 can also be used for multiplayer games.

As described above, each bracelet 202, 204 has a fair amount of independent functionality and a number of mechanisms for input and output on its own, and will typically operate independently for a major portion of its life cycle. However, each bracelet 202, 204 is typically associated with a device 206, 208 for situations in which greater input-output capabilities are required or communication with the outside world is desired. The device 206, 208 may be any device that can communicate with a bracelet 202, 204, and is preferably a device that can communicate with both the bracelet 202, 204 and with external computer networks, such as the Internet. Thus, the device 206, 208 is typically a smart phone or tablet computer, although some desktop computers are equipped with BLUETOOTH® communication capabilities and may be used as well. Of course, the nature of the device will depend on the communication protocol(s) that the bracelet 202, 204 implements—if, for example, the bracelet 202, 204 implements WiFi protocols, the number and type of devices that can interface with it will likely be larger.

The devices 206, 208 perform a number of functions for their respective bracelets 202, 204, including programming specific light sequences and animations and associating particular gestures with those light sequences and animations. The devices 206, 208 can also be used to set parameters for the bracelets 202, 204, to allow the user to enter profile information for the broader social network, to view the profiles of friends, and to view information on how much time the user has spent with each friend, the score(s) of any games played with that friend, and to access any other information associated with a particular bracelet 202, 204 or its user.

For example, the user may use the device 206, 208 associated with a bracelet 202, 204 to pre-load light sequences for a concert and define triggers for those sequences, such as a particular triggering gesture, a timing-based trigger (e.g., one hour into a concert), or a sound recognition trigger, based on input from the microphone 70. As another example, a user who is a cheerleader may program his or her bracelet 202, 204 to display certain light sequences in response to certain triggers. Alternatively, instead of programming a bracelet 202, 204 personally using its associated device 206, 208, the user may download a pre-programmed set of instructions from the social network server 210. In most embodiments, in addition to sharing profile information, social network users and friends will be able to share and download sets of instructions that, when implemented on the bracelets 202, 204, will cause particular light displays in particular, triggered circumstances.

When setting triggers and detecting when they have occurred, any of the positional and situational sensors 62 may be used. For example, although the microphone 70 may be used as the primary sensor to detect sound, the accelerometer 68 may, in some cases, be used to detect sound, or at least a strong beat that tends to vibrate the bracelet 202, 204. While the accelerometer 68 may not be used in all embodiments to detect sound, its output may be used in combination with that of the microphone 70 to confirm that relevant sounds are present.

In addition to performing input-output functions, in some selected embodiments, the devices 206, 208 may also be used for distributed processing. For example, as was described above, sound recognition may be used as a trigger for activating particular light sequences or other bracelet functions. If the tasks necessary for that recognition exceed the processing capability onboard the bracelets 202, 204, the bracelets 202, 204 may perform only a subset of the necessary functions, e.g., acoustic feature extraction, with the remaining functions performed in real time on the associated device 206, 208 or other computing systems with which the device 206, 208 is in communication.

There may also be a rare need for a user to cause his or her bracelet 202, 204 to perform a particular action or display a particular light sequence without physically performing the associated trigger, e.g., for testing or display purposes. In some embodiments, a device 206, 208 may be used to cause its associated bracelet 202, 204 to take a specific action without performing the gesture that would normally trigger that action. However, in most embodiments, physical actions and interactions by users are favored over software-based interactions.

In addition to their direct communication with their associated bracelets 202, 204, the devices 206, 208 also communicate via a communication network, such as the Internet, with a server 210 that stores information used in system 200, including user profiles and other information uploaded from the bracelets 202, 204 via their respective devices 206, 208. The server 210 thus provides a central repository for social network data. The details of hardware and software for managing a social network are well known in the art, and will not be repeated here. Briefly, the server 210 would typically be associated with a database 212 that stores information and would use a combination of server-side and client-side languages to create and instantiate social network profiles and associated Web pages. A Web server implemented in software on the server 210 or on a separate computing system associated with the server 210 typically provides those social network profiles, and associated information, using protocols like hypertext transfer protocol (HTTP).

The bracelets 202, 204 illustrate the direct pairing of bracelets 10 where two users are real-life friends and wish to become social network friends. However, as was described briefly above, other types of user interactions are possible in system 200.

There are a number of situations in which people may wish to associate contextually—e.g., a party, a get-together, a concert, or another type of large-group event. In that particular context, the people involved may choose to interact in specific ways, but will not wish to become full friends or share social network information with everyone present. For that reason, in system 200, users may pair their bracelets in a way that is specific to a particular context and allows sharing of some limited information and processing in that context, but that is not persistent and thus will not last beyond the particular context.

This is illustrated in FIG. 11, where a plurality of bracelets 214, 216, 218, 220, 222 have paired as a group and formed a mesh network. Group pairing may be achieved by having users in proximity of one another perform a particular gestural trigger, tap out a particular pattern on a touch-sensitive area, or perform any other identifiable action that can be used as an indication that the bracelets 214, 216, 218, 220, 222 should be paired with one another. As a further example, a user seeking to pair with a group could run a bar code or a color code across the color sensor 72. Notably, in FIG. 11, two nearby bracelets 224, 226 are not part of the paired group because, despite their proximity, the users of those bracelets 224, 226 have chosen not to perform the necessary trigger to pair and join the group. Once paired, the bracelets 214, 216, 218, 220, 222 can be used in multiplayer games, group light displays, and other activities.

In embodiments of the invention, group pairing and the establishment of contextual friends are preferably done in such a way that nodes—e.g., individual bracelets 10—can enter and leave the group easily. Once a group of bracelets 214, 216, 218, 220, 222 have assembled and paired, processing duties and communications may be shared between the bracelets 214, 216, 218, 220, 222, thus extending their effective communication range and processing power. These concepts are explored in more depth below with respect to FIGS. 12 and 13.

Figure 12:
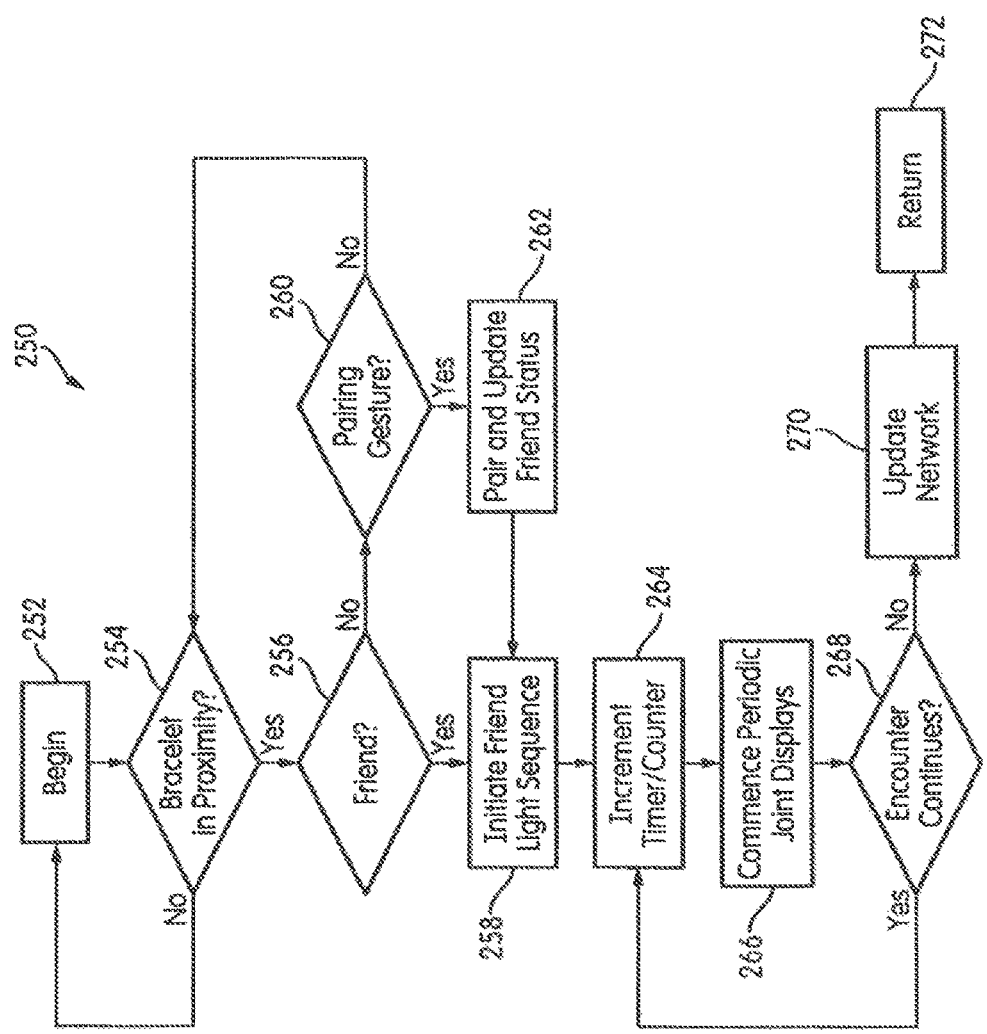
FIG. 12 is a flow diagram of a method of interaction between two bracelets in the system of FIG. 11.

FIG. 12 is a flow diagram of a method, generally indicated at 250, for a paired friend interaction, as shown, for example, with bracelets 202 and 204 of system. 200. Method 250 would typically be executed by software and hardware on the bracelets 202, 204, or on devices with other form factors that have similar or the same capabilities. Method 250 begins at task 252 and continues with task 254, a decision task. In task 254, a bracelet 202 determines whether there are any other bracelets 204 in proximity. If there are other bracelets 204 in proximity (task 254:YES), method 250 continues with task 256, another decision task. If there are no other bracelets 204 in proximity (task 254:NO), method 250 returns to task 252 and continues to search for other bracelets 204 at defined intervals. Those intervals will vary depending on a number of factors, primarily power consumption.

In task 256, the bracelet 202 interrogates the other bracelet 204 to obtain a hardware identifier and/or other information. If the hardware identifier indicates that the other bracelet 204 belongs to a social network friend (task 256: YES), method 250 continues with task 258. If the hardware identifier indicates that the other bracelet 204 does not belong to a social network friend (task 258:NO), method 250 continues with task 260.

In task 260, the bracelet 202 determines whether a pairing gesture has been initiated, indicating that the two bracelets 202, 204 are to be paired. If a pairing gesture is detected (task 260:YES), the two bracelets 202, 204 are paired and social network friend status is updated in task 262 before method 250 continues with task 258. If no pairing gesture is detected within a defined period of time, method 250 may simply ignore the bracelet 204 in question and return to task 254 to determine whether another bracelet 204 is in proximity.

By the time task 258 is executed, both bracelets 202, 204 have determined that a friend is nearby. Thus, in task 258, the bracelet 202 (or both bracelets 202, 204) will initiate a light sequence, a light sequence in combination with a vibration, or another kind of alert to indicate to their respective users that a friend is nearby. (The precise nature of the alert may be configurable using one of the associated devices 206, 208, and there may be situations in which a user would choose not to have a visible alert.)

Once two bracelets 202, 204 are paired for in-person interaction, or once existing friends are found in proximity to one another, any number of things may happen, including games and periodic light displays, and the remainder of method 250 illustrates but one example. For one, as was described briefly above, the bracelets 202, 204 and their associated system 200 are capable of tracking the amount of time that a user spends with specific friends, and the frequency with which he or she spends time with each of his or her social network friends. For that purpose, once the bracelets 202, 204 of two social network friends are in proximity, each bracelet 202, 204 begins and increments a timer to track the length of the interaction, as shown in task 264. Each bracelet 202, 204 may also increment a separate frequency counter to track the frequency with which the user interacts with the particular social network friend. Alternatively, in some embodiments, frequency and time may be calculated or derived from metadata transmitted to the social network server 210 after the fact. Method 250 continues with task 266.

During the interaction, as shown in task 266, the bracelets 202, 204 produce periodic light displays. These displays may span one bracelet 202 or the other bracelet 204, or they may be coordinated displays across both bracelets 202, 204. Depending on the embodiment, the nature of the displays may be driven by the types and frequency of movements detected by the accelerometer 68, by the nature of sounds or music detected by the microphone 70, by changes in lighting color or intensity detected by the color sensor 72, or by any other factors detectable by one of the bracelets 202, 204. While the two bracelets 202, 204 are in proximity, movements or other events detected by one bracelet 202, 204 may result in lighting displays, and changes in displays, on the other bracelet 202, 204.

As one example, when two friends meet, after a brief "friend" pattern displays on each bracelet 202, 204, the bracelets 202, 204 may go dark for a moment. Then, at some defined interval, a single red light may pass across one bracelet 202 and then across the other bracelet 204, illuminating both bracelets 202, 204 with red for a moment. The illumination may then slowly fade.

As a second example, the two bracelets 202, 204 may configure themselves as a single chain, with the first LED 26 of one bracelet 202, 204 marking the beginning of the chain and the last LED 26 of the other bracelet 202, 204 marking the end of the chain. The first LED 26 is initially set to red and the last LED 26 is initially set to blue, with the rest of the LEDs 26 forming a purple gradient. If one user moves his or her bracelet 202, 204, the gradient changes color, and if the other user moves his or her bracelet 202, 204, the gradient changes color again.

With respect to method 250 of FIG. 12, task 268 is a decision task. As long as the two bracelets 202, 204 remain in proximity, the light displays will typically continue, in some cases increasing in frequency, changing in color, or undergoing other changes as the encounter continues. In essence, the two bracelets 202, 204 implement a reactive particle system algorithm influenced by proximity, session duration, and gesture information. Thus, if the bracelets 202, 204 remain in proximity (task 268:YES), method 250 returns to task 264 and continues with additional light displays and functions. If the bracelets 202, 204 move out of proximity, (task 268:NO), the encounter ends.

Either when the encounter ends or periodically during an encounter, the bracelets 202, 204 may update the social network server 210 with the relevant information on the encounter, including the time duration of the encounter and the identities of any bracelets 202, 204 that were present during the encounter, as shown in task 270. This information may be transmitted through the associated devices 206, 208.

In many embodiments of the invention, two users may be rewarded depending on the lengths of their in-person encounters, with longer in-person encounters drawing greater rewards. The social network of system 200 may be used to implement these rewards. Users who have the longest and/or most in-person interactions may be given the greatest rewards. Rewards may be of any sort, and while some may be related to system 200 or to the bracelets 202, 204, others may not be. For example, users with longer duration in-person interactions or more in-person interactions may be given discounts on, or access to, particular sets of gem segments 100, 150. Users with longer-duration interactions may also be permitted to "unlock," download, and use particular features, games, and light displays that are not provided to every user.

Method 250 terminates and returns at task 272.

In this description, the term "proximity" may, in some cases, refer to bracelets 202, 204 that are at least as close as the maximum communication range of the respective radio transceivers 66 installed in the bracelets 202, 204. Thus, in those cases, the maximum range for a "proximity" or an "in person" encounter between two bracelets 202, 204 may be equal to their maximum communication range. However, in other embodiments, the bracelets 202, 204 will be "in proximity" for an encounter in the context of method 250 at a shorter range than the maximum communication range of the bracelets 202, 204. In other words, the bracelets 202, 204 and the systems 200 of which they are a part may limit "proximity" encounters to a range at which at least some of the people can see and, in some cases, touch each other.

While the description above focuses on interactions between two people, each of whom is wearing a bracelet 10, 202, 204, that need not be the case in all embodiments. For example, a device with the functionality of one of the bracelets 10, 202, 204 may be present in a fixed location, like a gym, a library, or another public place. By pairing with that device, a user may track the amount of time he or she spends in that location, or performing a specific activity within it—e.g., a user may track the amount of time he or she spends on a treadmill. In that case, as in method 250, light displays may be related and proportional to the user's level of physical activity, and may be timed and designed to encourage the user to complete activities of a certain duration or type.

More generally, as was briefly noted above, because the user's social network profile is associated with an actual piece of hardware worn or carried by the user, the social network created in system 200 is based on actual identity. In the real world, the presence of a particular bracelet 10 on a particular user may be used in some embodiments for verification and access control purposes. For example, the presence of a particular bracelet 10, 202, 204 may allow the user access to a membership gym, in lieu of scanning a membership card in a card scanner. Similarly, in online interactions, a user's social network identifiers from system 200 (e.g., login name and password) may be used to uniquely identify them on other websites and in other circumstances because that information is ultimately tied to a physical person, at least in most circumstances.

Figure 13:
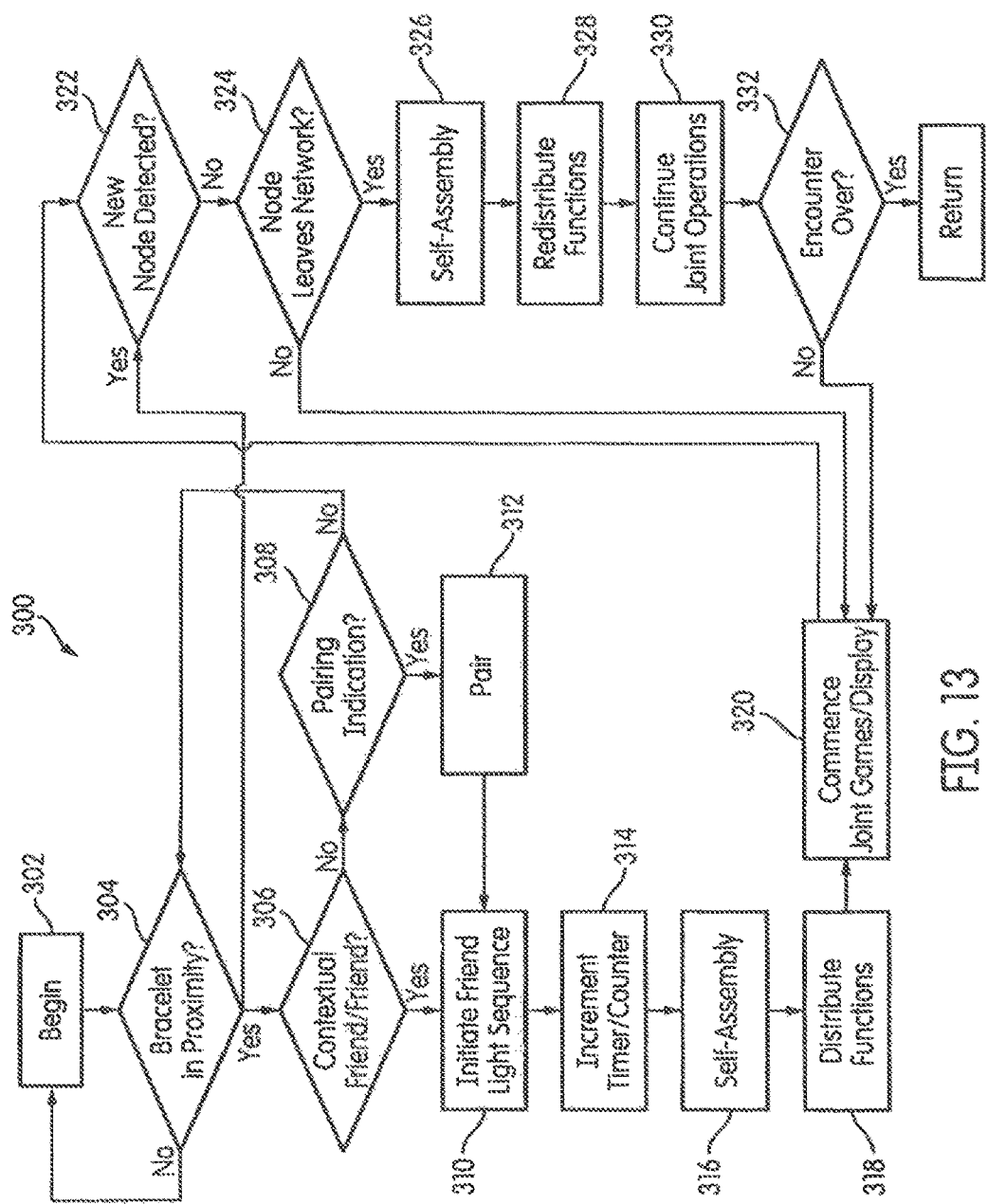
FIG. 13 is a flow diagram of a method of group interaction using a plurality of bracelets or other nodes in the system of FIG. 11.

Group operations with a number of bracelets 214, 216, 218, 220, 222 were described briefly above. FIG. 13 is a schematic diagram of a method, generally indicated at 300, for conducting a group interaction with a plurality of bracelets. Method 300 is similar in many respects to method 250 of FIG. 12; therefore, the description above will suffice for certain steps not described in great detail here. Method 300, like method 250, would typically be executed on a collection of bracelets 214, 216, 218, 220, 222 or on an equivalent collection of devices with other form factors that have similar or the same capabilities.

Method 300 begins at task 302 and continues with task 304. Tasks 304, 306, and 308 are similar to tasks 254, 256, and 260 of method 250. In task 304, method 300 detects a bracelet 214, 216, 218, 220, 222 in proximity. If there are no bracelets 214, 216 218, 220, 222 in proximity (task 304: NO), method 300 returns to task 302 and continues to search periodically for other bracelets 214, 216, 218, 220, 222 in proximity. If a bracelet 214, 216, 218, 220, 222 is found to be in proximity, method 300 continues with task 306. In task 306, method 300 determines whether the detected bracelet (s) 214, 216, 218, 220, 222 are already friends or contextual friends.

In some embodiments, existing social network fiends may automatically be designated as friends for contextual group operations as well without further action on the part of respective users. In other embodiments, existing social network friends may still need to perform a gesture or take other actions on their respective bracelets 214, 216, 218, 220, 222 to signify that they wish to participate in group operations.

In task 306, if the detected bracelet 214, 216, 218, 220, 222 is not already a friend or contextual friend (task 306: NO), method 300 continues with task 308, a decision task, and waits for some indication of contextual pairing. If the detected bracelet 214, 216, 218, 220, 222 is already a friend (if no special contextual pairing is needed for existing friends) or a contextual friend, method 300 continues with task 310 and initiates a "friend" light sequence to indicate that the bracelet 214, 216, 218, 220, 222 is paired for group activity.

In task 308, the indication or trigger for contextual pairing will typically be different from the gesture used to pair individual bracelets 202, 204 and their users as social network friends. A group of users may, for example, simultaneously wave their hands in a similar way to pair the bracelets 214, 216, 218, 220, 222 worn on their wrists. As with method 250, anything perceptible to the bracelets 214, 216, 218, 220, 222 may be used as a trigger for conceptual pairing in task 308. If such a pairing indication or trigger is detected in task 308, method 300 continues with task 312 and the bracelets 214, 216, 218, 220, 222 are paired for group activities before method 300 returns to task 310 and a "contextual friend" sequence is displayed or performed on the bracelets 214, 216, 218, 220, 222.

As with method 250, in method 300, once pairing is achieved, the bracelets 214, 216, 218, 220, 222 may implement timers and counters in order to track the amount of time the users spend in in-person interactions, as shown in task 314. In addition to the kinds of counting and tracking described above with respect to method 250, the timers and counters initialized and incremented in method 300 may include a counter that tracks the number of bracelets 214, 216, 218, 220, 222 and other nodes that are participating in the current contextual situation at any given time. (As used here, the term "node" is a general term that encompasses both bracelets 10, 202, 204, 214, 216, 218, 220, 222, and other devices that are not bracelets 10, 202, 204, 214, 216, 218, 220, 222 but that have similar or the same functionality and can thus participate in methods 250 and 300 and other methods according to embodiments of the invention.)

When a group of bracelets 214, 216, 218, 220, 222 is assembled for a contextual interaction, as shown in task 316, the bracelets 214, 216, 218, 220, 222 may be adapted to self-assemble or self-order according to their respective physical locations, so that, for example, a pattern may be displayed automatically from one end to the other of the assembled group. Algorithms for self-ordering and assembly are known in the art, and generally rely on triangulation, signal strength, etc. to identify nearest neighbors in the group. If ordering or nearest-neighbor detection is necessary or desirable, it is performed in task 316 before method 300 continues with task 318.

As was indicated briefly above, when multiple nodes, like bracelets 214, 216, 218, 220, 222, are assembled for a contextual game, in addition to self-assembly and nearest-neighbor detection, the bracelets 214, 216, 218, 220, 222 may be adapted to distribute functions among them and to implement both point-to-point communication among individual bracelets 214, 216, 218, 220, 222 and broadcast communication to all bracelets, as shown in task 318.

For example, in a group situation, some bracelets 214, 216, 218, 220, 222 and other nodes may be designated as relays, in which case they would be tasked with relaying messages between bracelets 214, 216, 218, 220, 222 and other nodes in order to increase the effective communication range and the number of bracelets 214, 216, 218, 220, 222 and other nodes that can participate. Other bracelets 214, 216, 218, 220, 222 might be tasked with listening for and detecting nodes entering and leaving the context. Still other bracelets 214, 216, 218, 220, 222 might be tasked with control responsibilities, controlling the light patterns displayed on the communicating bracelets. Additionally, other bracelets 214, 216, 218, 220, 222 and nodes might be tasked with scorekeeping, timing, and other such functions, while yet others (perhaps those whose control devices 206, 208 are present) might be tasked with reporting and logging status with the social network server 210. Generally speaking, status information for all bracelets 214, 216, 218, 220, 222 and nodes is shared among the group. Method 300 continues with task 320.

In task 320, method 300 commences whatever joint games or displays are programmed, initiated, or desired by the users. There may be general displays that vary with the number of users and with the amount of time the group of users is together. For example, the more bracelets 214, 216, 218, 220, 222 or other nodes join the group, the brighter the LEDs 36 on each bracelet 214, 216, 218, 220, 222 may be lit, or the more sustained and complex a particle-based lighting display may become. The kinds of games and activities described above with respect to a two-bracelet 202, 204 interaction may be extended for a multi-user environment involving several bracelets 214, 216, 218, 220, 222 and potentially other nodes.

As one particular example of a group game, the bracelets 214, 216, 218, 220, 222 may implement a group form of the well-known SIMON® memory game. One user may move his or her bracelet 214, 216, 218, 220, 222 in a particular way to create a particular light display pattern, and the next user would then be challenged to repeat the previous user's sequence before moving his or her bracelet 214, 216, 218, 220, 222 in a different way to add on a move, which the following user would then have to duplicate.

Users may also be able to use their bracelets 214, 216, 218, 220, 222 to collectively set and modify light patterns—a single user moves his or her bracelet 214, 216, 218,

220, 222 to start a color gradient or a particle-based effect, and other users gradually move or take other actions with their bracelets 214, 216, 218, 220, 222 to modify that pattern or effect. The possibilities are numerous.

Method 300 continues with task 322. In method 300, it is advantageous if bracelets 214, 216, 218, 220, 222 and other nodes are allowed to enter and leave contextual games and other situations easily and seamlessly, without interfering with the operations of the remaining participants. Task 322 is a decision task. As was described above, even after a contextual game or other interaction is initiated, at least one of the bracelets 214, 216, 218, 220, 222 or nodes continues to look actively for new bracelets 214, 216, 218, 220, 222 or other nodes coming into range. If a new node is detected in task 322 (task 322:YES), method 300 returns to task 306 to bring that node into communication with the other bracelets 214, 216, 218, 220, 222 or other nodes. If no new nodes are detected in task 322 (task 322:NO), method 300 continues with task 324.

Task 324 is also a decision task, in which the bracelets 214, 216, 218, 220, 222 or other nodes detect whether or not any nodes have left the mesh network established when the contextual interaction began. If one or more bracelets 214, 216, 218, 220, 222 or other nodes have left the network (task 324:YES), method 300 continues with task 326, in which self-assembly and nearest-neighbor detection are repeated, followed by task 328, in which shared functions are redistributed among the remaining bracelets 214, 216, 218, 220, 222 or other nodes. Joint contextual operations then continue in task 330. If no nodes have left the network (task 324:NO), control of method 300 returns to task 320, and the joint games or other operations continue without network alteration.

After task 330, method 300 determines in task 332 whether or not the contextual encounter is over. A contextual encounter may end when all bracelets 214, 216, 218, 220, 222 or nodes move out of range of one another, such that the ad hoc network that was established cannot be continued, or when the users of the various nodes take affirmative action to unpair and declare the encounter at an end. That unpairing action may be similar to the action taken to pair contextually and begin the encounter, e.g., a wave in the opposite direction than a wave that created the pairing. If the encounter is over (task 332:YES), either by an affirmative impairing or by lack of remaining nodes, method 300 completes and returns at task 334. If the encounter is not over (task 332:NO), method 300 returns to task 320.

In the description of methods 250 and 300 above, it was assumed that individual bracelets 10 automatically distinguish single-friend and group interactions. However, in some embodiments, an individual bracelet 10 may have a number of distinct modes for different situations, and a user may need to manually enable or switch between modes using either gestural triggers on the bracelet 10 itself or, in some cases, commands issued by an associated device 206, 208. A user might cycle through the various modes with a simple gesture or touch. In each case, a mode switch may be associated with a particular light or vibration sequence to indicate a successful switch.

In other cases, an individual bracelet 10 may be programmed and otherwise adapted to switch automatically between modes, with particular sequences used to alert the user as to the current mode. Table 1 below is an exemplary list of modes.

TABLE 1

Exemplary list of modes for a bracelet.

| Mode | Description | Light Effect |
|---|---|---|
| Friend Mode | Restricted to standard proximity recognition | lights start at ends of bracelet and meet in the middle |
| Group Mode | Recognition of "temporary" or event-based friends | Contextually dependent |
| Stealth Mode | Lights are deactivated | Bracelet lights up and fades off |
| Color Sensor Mode | Color sensor turned on | All lights lit in different colors |
| Music Mode | Microphone turned on | All lights on/off to a beat |

With respect to "music mode" in Table 1 above, a low-pass filter implemented in software at the main control unit 56 may be used to attenuate higher frequencies and isolate a beat in the incoming sound. The LEDs 36 may then be made responsive to that beat, for example, by changing color with increasing or decreasing beat amplitude (i.e., loudness) in addition to pulsating at the same frequency as the beat. More complex responses to different frequencies or frequency bands are possible and, as was described above, in some cases, the bracelets 10 may use a distributed processing scheme, relying on the processing capabilities of the associated device 206, 208 to process sound. In some cases, users may be permitted to define responses to particular types of beats, or design light sequences that are to be associated with particular types of beats.

It should be understood that while Table 1 presents a number of specific modes, the bracelets 10 and their main control units 56 are capable of many simultaneous operations. Thus, the fact that a particular bracelet 10 may be in "color sensor mode" does not mean that other components, like an accelerometer 68 or a microphone 72, need be inactive.

Although system 200 puts significant emphasis on in-person interaction, as was briefly described above, the server 210 and other portions of system 200 also provide a robust interface for remote and online interaction among friends, and the automatic data logging of interactions, described with respect to methods 250 and 300, provides considerable data that can be used to enrich online interactions.

Figure 14:
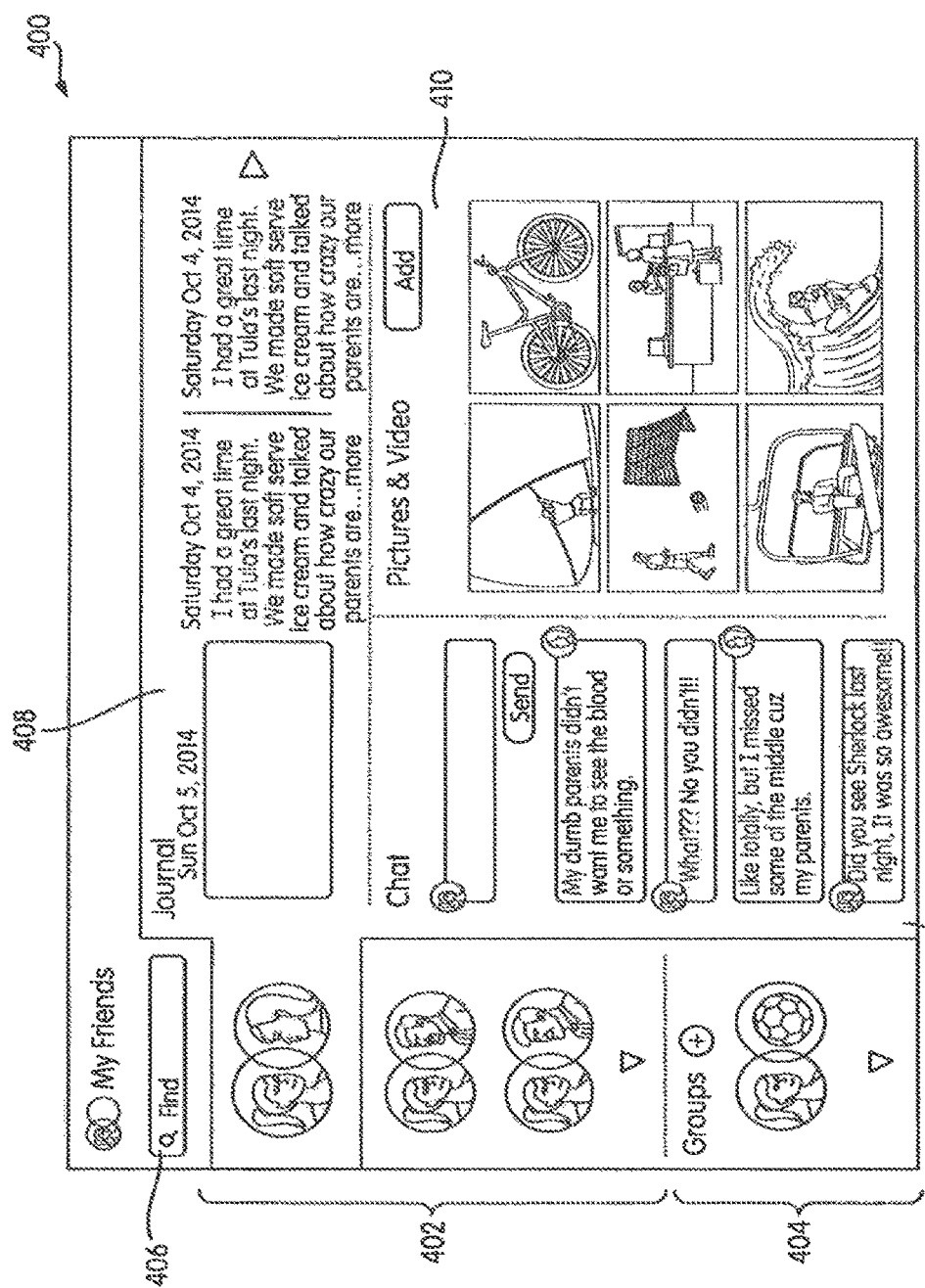
FIG. 14 is an illustration of a social network page that may be used by a user in the system of FIG. 11.

FIG. 14 is an illustration of a social network homepage, generally indicated at 400, that may be used in the social network of system 200 to review information and relationships and perform other social network functions with friends. The social network homepage 400 also illustrates some of the functions that may be performed using the social network of system 200.

The social network homepage 400 may be accessed with any device connected to the Internet, or to whatever other communication network is used. While users may access social network features like the social network homepage 400 through the devices 206, 208 that are paired with their bracelets 202, 204, it is advantageous if most, if not all, features of the social network are accessible from any network-connected device or computing system, like the laptop computer 230 shown in FIG. 11. Connected devices 206, 208, 230 may use either general browser client software to access the social network homepage 400, or may use specialized, compiled or interpreted applications specific to the device 206, 208, 230. These elements are well known in the art. While the interface provided by the social network of system 200 may be text-based on some embodiments, either for functional purposes or to comply with accessibility standards, web pages like the social network homepage 400 preferably present a graphical user interface (GUI) that allows the user to interact with friends and accumulated information in a more natural and intuitive way.

The social network homepage 400 itself has a friend selection area 402 that allows the user to select a specific friend pairing by profile picture or name. A group selection area 404 below the friend selection area 404 allows the user to select a group of friends, or to create a new one, in the same manner. A search area 406 allows the user to find particular friends by name, or by content associated with that friend.

Once the user has selected a particular friend in the friend selection area 402, a number of areas and controls are instantiated. A journal area 408 allows a user to view logs indicating his or her interactions with the particular friend and to add journal entries that encapsulate particular memories, what was happening during the encounter, and other related information. In the picture and video area 410, the user can add pictures and videos with the particular friend, either associated with a particular logged interaction, or associated with the friend but not associated with any particular logged interaction. A chat area 412 allows the user to send and receive instant messages with the friend in question and logs the messages.

In order to facilitate messaging, the server 210 that holds the data may be associated with or contain a chat server, such as a Jabber server 232. The server 210 may also be associated with or contain a simple message service (SMS) gateway 234 for sending SMS text messages on networks controlled by cellular carriers.

Of course, the social network and the homepage 400 may have or allow any other features, including sharing portions of the journal or activity long among a group of friends, and friend list management. In particular, while pairing of friends is preferably done by in-person interaction, a user would generally be permitted to "unfriend" or sever friend pairings by using an interface like the homepage 400. In order to avoid affecting real-life relationships, such "unfriending" may be silent or without notification to the person being "unfriended."

Either as a web-based application accessible from the social network homepage 400 or as an application running on a device 206, 208, system 200 and other systems according to embodiments of the invention may provide interfaces allowing users to design their own light patterns for bracelets 10 and other functional jewelry.

Figure 15:
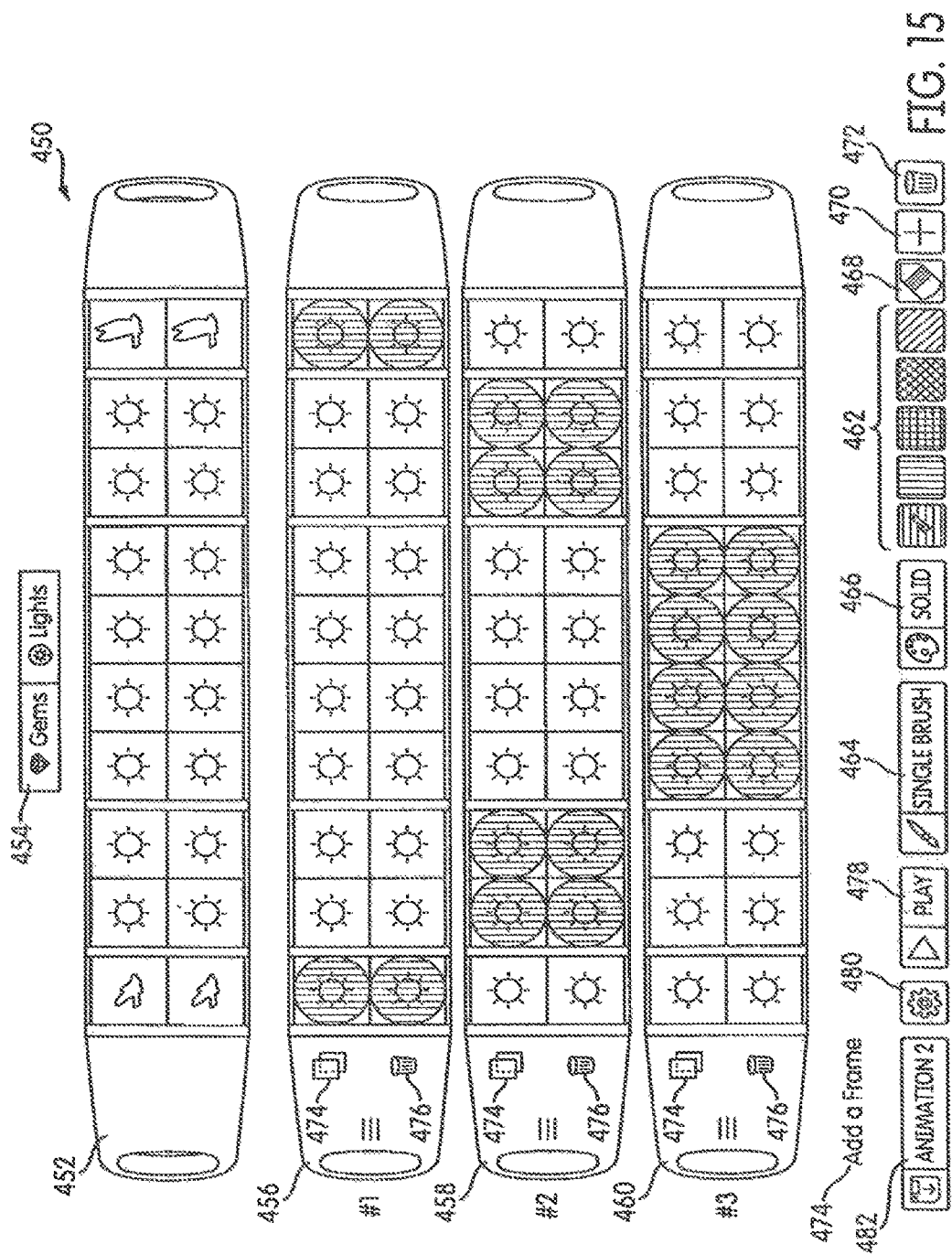
FIG. 15 is an illustration of an application that may be used to design light and animation patterns for bracelets and social networks according to embodiments of the invention.

FIG. 15 is an illustration of a light design application interface, generally indicated at 450, according to one embodiment of the invention. The interface 450 includes a bracelet simulation 452 that depicts a bracelet 10. A mode selector 454 allows the user to switch between bracelet-design mode and animation-design mode. In bracelet-design mode, the user can choose particular segments 13, 14, 16, 18, 20 to appear in the bracelet simulation 452, so that the simulation 452 has the same general appearance that the user's bracelet 10 would.

In animation-design mode, the mode shown in the illustration of FIG. 15, beneath the bracelet simulation 452 are a plurality of keyframe simulations 456, 458, 460. Each keyframe simulation 456, 458, 460 shows every LED 36 available on the bracelet 10. Using a defined color palette 462, a brush size selector 464, and a fill type selector 466, the user can choose a color, a brush size (e.g., single LED 36, 2×4, 4×4, etc.), and a fill type (e.g., solid, gradient, etc.) and "paint" the LEDs 36 in the keyframe. An erase tool 468 is also provided to erase the colors and attributes given to LEDs 36. Depending on the embodiment, the interface 450 may also provide a control 470 to add colors to the color palette selector 462 and a control 472 to remove colors from the color palette selector 462. As was described briefly above, in some embodiments and in some situations, the color palette 462 provided to a user using the interface 450 may be limited, with more colors available to users who have had more in-person interactions with friends.

At any point, the user can also select a button 474 to add a keyframe and a corresponding keyframe simulation. Each keyframe simulation 456, 458, 460 also carries a button 474 to add a keyframe and a corresponding keyframe simulation and a button 476 to delete the keyframe simulation 456, 458, 460 and the corresponding keyframe.

Additionally, a "play" control 478 allows the user to simulate the full animation on the bracelet simulation 452 at any point in the process, and a settings control 480 allows the user to set the speed of the animation and the number of times the animation loops. Finally, an animation selector 482 allows the user to select between any number of animations that he or she has prepared for editing, erasure, or use as a template for a new animation. Once an animation has been created using an interface like interface 450, it may be downloaded to a bracelet 10, where the bracelet 10 and its keyframe generator 72, particle simulator 72 and natural effects simulator 74 will generate transitions between the keyframes and perform the other necessary animation tasks.

While the interface 450 may be implemented in a standard Internet browser client on a desktop or laptop computer and, therefore, take input using standard peripherals, like trackpads and mice, certain advantages may be realized if the interface is implemented on a touch-sensitive device. In that case, a user may use continuous gestures to "paint" the LEDs in the keyframes 456, 458, 460 as he or she desires, creating an animation, for example, by "swiping" across several keyframes 456, 458, 460 with a single stroke. More generally, regardless of the medium or mode of input, with interfaces like interface 450, the user is not necessarily limited to designating the color and other properties of the LEDs one at a time.

Custom animations may be used in a number of different contexts, and some of those were described above. As a further example, social network friends may create and share animations that are specific to specific friends, and may choose specific gestural or other triggers for those animations. Users may use these custom animations to communicate, with specific animations or displays having specific meanings, like Morse code. Additionally, custom animations may be used, for example, in task 258 of method 250 and in tasks 310 and 320 of method 300. While the meanings and uses of certain gestures may be predefined, users may assign particular functions to at least some gestures.

Figure 16:
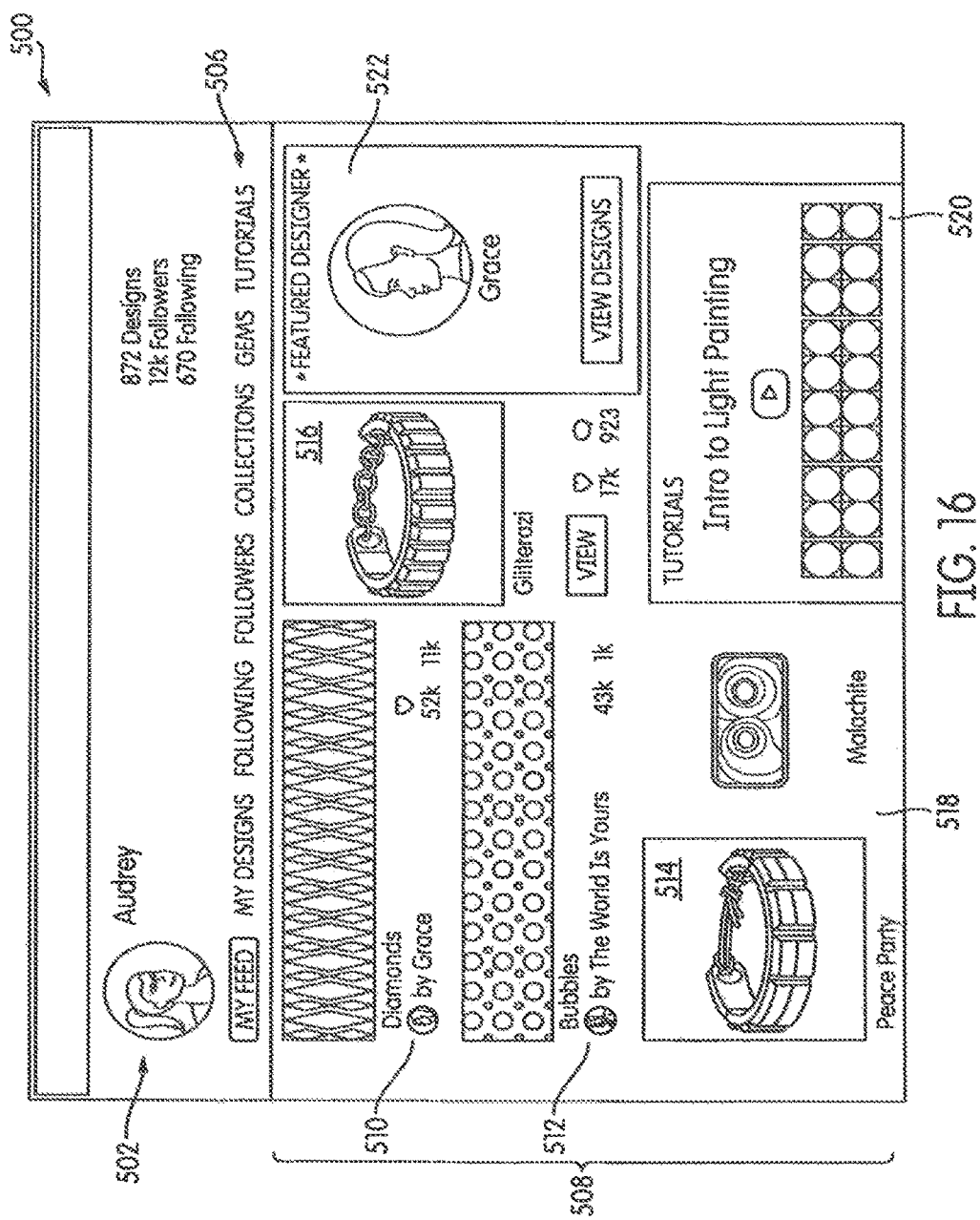
FIG. 16 is an illustration of another social network page.

FIG. 16 is an illustration of another social network page, generally indicated at 500. While the social network page 400 of FIG. 14 offers the user access to his or her personal information, memories, and personal interactions with friends, other aspects of a social network according to embodiments of the invention may allow a user to view, share, track, follow, and use content related to the bracelets 10 and other functional jewelry, as well as light designs and other animations created with the interface 450. As with the social network page 400 of FIG. 14 and other social network features, establishment of a page like social network page 500 may be limited to users of bracelets 10, with identity verification and access based on linking to a specific identifier associated with a specific bracelet 10. Of course, in some embodiments, certain pieces of content may be set so that they can be viewed by the general public regardless of association with a bracelet 10.

The social network page 500 includes a header or identifier section 502 that includes a photograph of the user and other identifying information. A statistics area 504 provides information on the number of bracelet and light designs that are associated with that particular user, as well as the number of other users that the user is following, and the number of others that are following the user. Any other metrics that are typical or appropriate for a social network may also be presented.

A selector or menu system 506 allows the user to see his or her social network feed; to see, select, edit, and create new light designs and segment designs; to see the designs and other content created by those the user follows; to see the designs and other content created by those the user is following; to see different collections of segments 13, 14, 16, 18, 20 of different designs; and to see tutorials on how to use various aspects of the bracelets 10 and the design tools for them.

With respect to segment designs, as was described above, the segments 13, 14, 16, 18, 20 may be UV printed. An additional advantage of UV printing is that segment designs can be rapidly taken from a design tool and directly printed. Additionally, three-dimensional "gemlike" segments 13, 14, 16, 18, 20 may be made using rapid prototyping techniques, like three-dimensional printing. These kinds of techniques enable custom manufacturing, such that users can design not only light sequences but designs for segments 13, 14, 16, 18, 20 and have those segments 13, 14, 16, 18, 20 manufactured and shipped to them using features provided by the social network pages 400, 500.

Below the various selectors and elements in social network page 500 of FIG. 16, a content or feed area 508 presents a pastiche of different types of content culled from sources in which the user has expressed interest, including other users, particular designs and families of designs, and tutorials or informational content. As shown in FIG. 16, the feed area 508 displays two different segment designs 510, 512 from different designers the user is following; two different designs 514, 516 for bracelets 10 themselves; information on a particular segment design 518, a video tutorial on creating light and animation designs, and a profile précis 522 for a designer the user is following. As with most social network feeds, the content that any particular user sees will vary at intervals, sometimes continuously, depending on what other social network users are posting. The frequency with which the user sees posts or content from a particular source will depend on a number of factors, including the user's past degree of engagement with that source and other explicit and implicit indicators of interest, as well as the desire of the social network provider and others to push or promote various content.

Portions of this description set forth a number of actions performed by the bracelets 10, the server 212, and other electronic components, and refer to "software." As the term "software" is used in this description, it refers to sets of machine-readable instructions on a non-transitory machine-readable medium that, when executed by a machine, cause that machine to perform certain steps or take certain actions. Any of the actions described here and attributed to the bracelets 10, or to other components, may be encapsulated in software. In the case of the bracelet 10, the non-transitory machine-readable medium would typically be flash memory or any other type of programmable, non-transitory memory. In the case of the server 212, the non-transitory machine-readable medium would either be flash memory, a hard disk drive, or a solid state drive, to give but a few examples.

While the invention has been described with respect to various embodiments, the description is intended to be exemplary, rather than limiting. Modifications and changes may be made within the scope of the invention, which is defined by the appended claims.

What is claimed is:

1. A method of synchronizing sounds and lights on a wearable item of jewelry, the method comprising:
    positioning a microphone on the jewelry;
    positioning an array of light-emitting diodes (LEDs) on the jewelry;
    actuating the microphone to detect ambient sounds with a controller positioned on the jewelry;
    processing the sounds with the controller to generate a control audio signal;
    energizing the LEDs to emit light in synchronization with the control audio signal;
    positioning a color sensor on the jewelry;
    actuating the color sensor to detect an ambient color;
    processing the detected color with the controller to generate a control video signal; and
    energizing the LEDs to emit the light with colors that complement the ambient color in synchronization with the control video signal.

2. The method of claim 1, wherein the sounds have a beat, and wherein the LEDs are energized to emit the light in synchronization with the beat.

3. The method of claim 2, wherein the beat has a frequency, and wherein the processing filters the sounds with a filter to identify the frequency.

4. The method of claim 3, wherein the energizing of the LEDs is performed rhythmically in accordance with the identified frequency.

5. The method of claim 1, and configuring the jewelry as a bracelet having a plurality of segments, and positioning the LEDs on the segments.

6. The method of claim 1, and pairing the item of jewelry with at least one other proximally located item of jewelry over a wireless network, and wherein the pattern of light selected by the interactive controls is performed by all the items of jewelry.

7. The method of claim 6, and configuring the wireless network as a mesh network in which all the items of jewelry are nodes.

8. A wearable item of jewelry with synchronized sounds and lights comprising:
    a microphone configured to detect ambient sounds;
    an array of light-emitting diodes (LEDs);
    a color sensor configured to detect an ambient color; and
    a controller configured to:
        process the detected ambient sounds to generate a control audio signal;
        process the detected ambient color to generate a control video signal; and
        energize the LEDs to emit light in synchronization with the control audio signal and with colors that match or complement the detected ambient color in synchronization with the control video signal.

9. The wearable item of jewelry of claim 8, wherein the detected ambient sounds have a beat, wherein the controller is configured to energize the LEDs to emit light in synchronization with the beat.

10. The wearable item of jewelry of claim 9, wherein the beat has a frequency, wherein the controller is configured to filter the detected ambient sound to identify the frequency of the beat.

11. The wearable item of jewelry of claim 10, wherein the controlled is configured to energize the LEDs rhythmically in accordance with the identified frequency.

12. The wearable item of jewelry of claim 8, wherein the controller is configured to pair the item of jewelry with at least one other proximally located item of jewelry over a wireless network, wherein each of the at least one other proximally located items of jewelry are configured to emit light in synchronization with the control audio signal and with colors that match or complement the detected ambient color in synchronization with the control video signal.

13. The wearable item of jewelry of claim 12, wherein the wireless network is configured as a mesh network in which all items of jewelry are nodes.

14. The wearable item of jewelry of claim 8, wherein the color sensor is configured to detect a rate of change of the ambient color; and the controller is configured to energize the LEDs based on the detected rate of change of the ambient color.

15. The wearable item of jewelry of claim 8, wherein the color sensor is configured to detect a transition from one ambient color to another, and the controller is configured to energize the LEDs based on the detected transition.

16. The wearable item of jewelry of claim 8, wherein the color sensor is configured to detect a bar code or a color code, and the controller is configured to:
receive an indication that the color sensor detected a bar code or a color code; and
in response to receiving the indication, pairing with an additional device.

17. The wearable item of jewelry of claim 16, wherein the additional device comprises a second wearable item of jewelry.

18. The wearable item of jewelry of claim 17, wherein the bar code or color code is displayed on the second wearable item of jewelry for detection by the color sensor.

\* \* \* \* \*